(12) United States Patent
Li

(10) Patent No.: US 12,537,595 B2
(45) Date of Patent: Jan. 27, 2026

(54) CELL RESELECTION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xiaolong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 338 days.

(21) Appl. No.: 18/257,691

(22) PCT Filed: Dec. 25, 2020

(86) PCT No.: PCT/CN2020/139604
§ 371 (c)(1),
(2) Date: Jun. 15, 2023

(87) PCT Pub. No.: WO2022/134065
PCT Pub. Date: Jun. 30, 2022

(65) Prior Publication Data
US 2024/0120992 A1    Apr. 11, 2024

(51) Int. Cl.
*H04B 7/185* (2006.01)
*H04W 36/00* (2009.01)
*H04W 84/06* (2009.01)

(52) U.S. Cl.
CPC .. *H04B 7/18541* (2013.01); *H04W 36/00837* (2018.08); *H04W 84/06* (2013.01)

(58) Field of Classification Search
CPC ........ H04B 7/18541; H04W 36/00837; H04W 84/06; H04W 36/249; H04W 36/322
See application file for complete search history.

(56) References Cited

U.S. PATENT DOCUMENTS

2020/0178135 A1    6/2020   Yun et al.
2022/0104083 A1*   3/2022   Jeong ................... H04W 36/08
(Continued)

FOREIGN PATENT DOCUMENTS

| CN | 110493833 A | 11/2019 |
| CN | 111356185 A | 6/2020 |
| CN | 111371487 A | 7/2020 |

(Continued)

OTHER PUBLICATIONS

Ericsson, Aspects for Earth fixed and Earth moving beams for NTN, 3GPP TSG-RAN WG2 Meeting #112 electronic, R2-2009823, Online, Nov. 2-13, 2020, 8 pages.

(Continued)

*Primary Examiner* — Ashley Shivers
(74) *Attorney, Agent, or Firm* — Finnegan, Henderson, Farabow, Garrett & Dunner, L.L.P.

(57) ABSTRACT

A cell reselection method includes: determining, according to service time determined based on auxiliary information, an operation of performing cell reselection, wherein the service time is time in which a non-terrestrial network (NTN) service cell can provide service to a terminal, and the auxiliary information includes at least one of coverage information of the NTN service cell, ephemeris information of the NTN service cell, or information of reference service time in which the NTN service cell can provide service.

20 Claims, 12 Drawing Sheets

Step 41, determining, according to service time determined based on auxiliary information, an operation of performing cell reselection, wherein the service time is time in which a non-terrestrial network (NTN) service cell can provide service to the terminal, and the auxiliary information includes coverage information of the NTN service cell, ephemeris information of the NTN service cell, and/or information of reference service time in which the NTN service cell can provide service

(56) References Cited

U.S. PATENT DOCUMENTS

2022/0217602 A1* 7/2022 Geng ............... H04W 36/322
2023/0300700 A1* 9/2023 Rune ............... H04W 48/16
370/329

FOREIGN PATENT DOCUMENTS

| CN | 111756454 A | 10/2020 |
|---|---|---|
| CN | 111800830 A | 10/2020 |
| WO | WO 2020/030713 A2 | 2/2020 |
| WO | WO 2020/231123 A1 | 11/2020 |

OTHER PUBLICATIONS

International Search Report of International Application No. PCT/CN2020/139604, dated Aug. 30, 2021, 3 pages.
Xiaomi, "Initial discussion on RRM impact for NR NTN system," 3GPP TSG-RAN4 Meeting #97-e, R4-2014658, Electronic meeting, Nov. 2-13, 2020, 4 pages.
3GPP TR 38.821 V16.0.0 (Dec. 2019), 3rd Generation Partnership Project; Technical Specification Group Radio Access Network; Solutions for NR to support non-terrestrial networks (NTN); (Release 16), 140 pages.
Xiaomi Communications, "Discussion on mobility management in NTN," 3GPP TSG RAN WG2 #112, R2-2010446, e-Meeting, Nov. 2-13, 2020, 5 pages.
Huawei, HiSilicon, "Discussion on RRC_IDLE mode issues in NTN," 3GPP TSG RAN WG2 #112-e, R2-2009637, Online, Nov. 2-3, 2020, 3 pages.
European Patent Office, Extended European Search Report issued in Application No. 20966629.6, dated Jan. 16, 2024, 13 pages.
Notice of First Examination Opinion, for Chinese Application No. 202080004197.X, dated Aug. 12, 2023, 14 pages.

* cited by examiner

CELL RESELECTION METHOD AND APPARATUS, COMMUNICATION DEVICE, AND STORAGE MEDIUM

CROSS-REFERENCE TO RELATED APPLICATIONS

The present application is a U.S. National Stage of International Application No. PCT/CN2020/139604 filed on Dec. 25, 2020, the entire contents of which are incorporated herein by reference.

TECHNICAL FIELD

The present disclosure relates to the technology field of wireless communication but is not limited thereto, in particular, to a cell reselection method and device, communication apparatus and storage medium.

BACKGROUND

In the fifth-generation mobile communication technology, i.e., New Radio (NR), for terrestrial networks (TN), a terminal may perform cell selection and reselection according to S and R criteria. The terminal may determine whether the terminal is at the edge of a cell by comparing measured reference signal receiving power (RSRP) with the RSRP at the center of the cell, thereby performing neighbor cell measurement and cell reselection.

SUMMARY

Embodiments of the present disclosure provides a cell reselection method and device, communication apparatus and storage medium.

A first aspect of the present disclosure provides a cell reselection method, including:
  determining, according to service time determined based on auxiliary information, an operation of performing cell reselection,
  wherein the service time is time in which a non-terrestrial network (NTN) service cell can provide service to a terminal, and the auxiliary information includes coverage information of the NTN service cell, ephemeris information of the NTN service cell, and/or information of reference service time in which the NTN service cell can provide service.

A second aspect of the present disclosure provides a cell reselection method, including:
  sending auxiliary information to a terminal,
  wherein the auxiliary information is configured for the terminal to determine service time in which a non-terrestrial network (NTN) service cell can provide service to the terminal, and the auxiliary information includes coverage information of the NTN service cell, ephemeris information of the NTN service cell, and/or information of reference time in which the NTN service cell can provide service.

A third aspect of the present disclosure provides a cell reselection device applied to a terminal, including:
  a determining module, configured to determine, according to service time determined based on auxiliary information, an operation of performing cell reselection,
  wherein the service time is time in which a non-terrestrial network (NTN) service cell can provide service to the terminal, and the auxiliary information includes coverage information of the NTN service cell, ephemeris information of the NTN service cell, and/or information of reference service time in which the NTN service cell can provide service.

A fourth aspect of the present disclosure provides a cell reselection device applied to a base station, including:
  a sending module, configured to send auxiliary information to a terminal,
  wherein the auxiliary information is configured for the terminal to determine service time in which a non-terrestrial network (NTN) service cell can provide service to the terminal, and the auxiliary information includes coverage information of the NTN service cell, ephemeris information of the NTN service cell, and/or information of reference time in which the NTN service cell can provide service.

A fifth aspect of the present disclosure provides a communication apparatus, including:
  a processor; and
  a memory for storing instructions executable by the processor,
  wherein the processor is configured to perform any one of the above cell reselection methods.

A sixth aspect of the present disclosure provides a computer storage medium having computer-executable programs stored thereon that, when being executed by a processor, cause the processor to perform any one of the above cell reselection methods.

DETAILED DESCRIPTION

Exemplary embodiments will be described in detail herein, examples of which are illustrated in the accompanying drawings. When the following description is made with reference to the drawings, the same numerals in different drawings refer to the same or similar elements unless otherwise indicated. The implementations described in the embodiments below are not intended to represent all implementations of the embodiments of the present disclosure. Rather, they are merely examples of devices and methods according to some aspects of the embodiments of the present disclosure as recited in the appended claims.

The terms used in embodiments of the present disclosure are used solely for the purpose of describing particular embodiments and are not intended to limit embodiments of the present disclosure. The singular forms of "a" and "the" as used in the embodiments of the present disclosure and the appended claims are also intended to include the plural forms, unless the context clearly indicates otherwise. It should also be understood that the term "and/or" as used herein refers to and includes any or all possible combinations of one or more of the associated listed items.

It should be understood that although the terms first, second, third, and the like may be used in embodiments of the present disclosure to describe various information, such information should not be limited by these terms. These terms are used only to distinguish information of the same type from one another. For example, without departing from the scope of embodiments of the present disclosure, first information may also be referred to as second information, and similarly, the second information may also be referred to as the first information. Depending on the context, for example, the word if as used herein may be interpreted as "while . . . " or "when . . . " or "in response to determining that . . . ".

For the sake of brevity and ease of understanding, the terms "greater than" or "less than" are used herein to characterize size relationships. However, it will be understood by those skilled in the art that the term "greater than" also covers the meaning of "greater than or equal to" and the term "less than" also covers the meaning of "less than or equal to".

Figure 1:
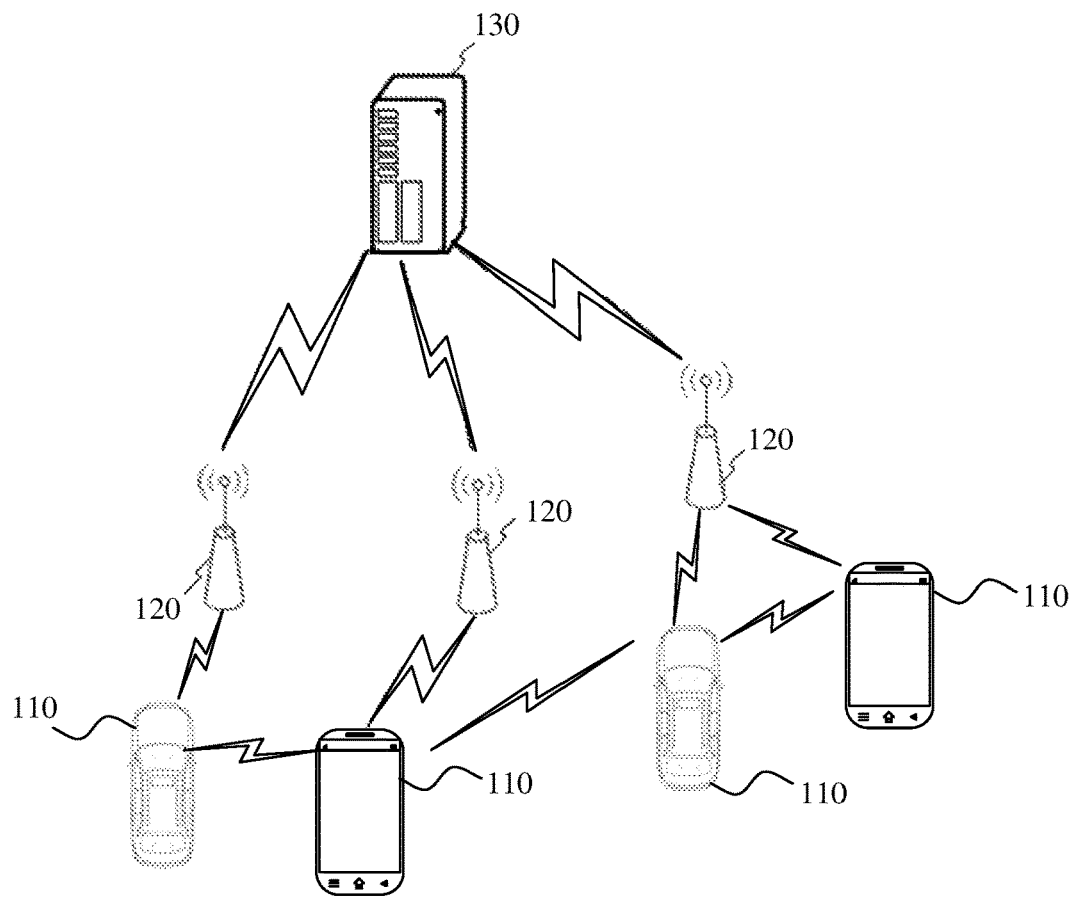
FIG. 1 is a schematic diagram of a wireless communication system according to an embodiment.

FIG. 1 illustrates a schematic diagram of a wireless communication system according to an embodiment of the present disclosure. As shown in FIG. 1, the wireless communication system is a communication system based on mobile communication technology, and the wireless communication system may include a plurality of user devices 110 and a plurality of base stations 120.

The user device 110 may be a device providing voice and/or data connectivity to a user. The user device 110 may communicate with one or more core networks via a Radio Access Network (RAN). The user device 110 may be an IoT user device such as a sensor device, mobile phone (or "cellular" phone), and may be a computer with an IoT user device, for example, which may be a fixed, portable, pocket-sized, handheld, computer-built or vehicle-mounted device. For example, it may be a station (STA), subscriber unit, subscriber station, mobile station, mobile, remote station, access point, remote terminal, access terminal, user terminal, user agent, user device, or user equipment. Alternatively, the user device 110 may be an unmanned aerial vehicle device. Alternatively, the user device 110 may be a vehicle-mounted device, for example, a trip computer with a wireless communication capability, or a wireless user device externally connected to a trip computer. Alternatively, the user device 110 may be a roadside device, for example, a street light, a signal light or other roadside device with a wireless communication capability.

The base station 120 may be a network-side device in the wireless communication system. The wireless communication system may be the 4th generation mobile communication (4G) system, also known as the Long Term Evolution (LTE) system, or the wireless communication system may be the 5th generation mobile communication (5G) system, also known as the New Radio system or the 5G NR system. Alternatively, the wireless communication system may be a next generation system of the 5G system. The access network in the 5G system may be referred to as New Generation-Radio Access Network (NG-RAN).

The base station 120 may be an evolved base station (eNB) as used in the 4G system. Alternatively, the base station 120 may be a base station (gNB) with a centrally distributed architecture used in the 5G system. When the base station 120 adopts the centrally distributed architecture, it typically includes a central unit (CU) and at least two distributed units (DU). The central unit is provided with a protocol stack of Packet Data Convergence Protocol (PDCP) layer, Radio Link Control (RLC) layer and Media Access Control (MAC) layer, and the distributed unit is provided with a protocol stack of physical (PHY) layer. The specific implementation of the base station 120 is not limited in embodiments of the present disclosure.

A wireless connection may be established between the base station 120 and the user device 110 via a wireless radio. In various implementations, the wireless radio is a wireless radio based on the 4th generation mobile communication network technology (4G) standard, or the wireless radio is a wireless radio based on the 5th generation mobile communication network technology (5G) standard, for example, the wireless radio is the New Radio, or the wireless radio may also be a wireless radio based on the next generation mobile communication network technology standard of 5G.

In some embodiments, an end to end (E2E) connection may also be established between user devices 110, examples of which include vehicle to vehicle (V2V) communication, vehicle to infrastructure (V2I) communication and vehicle to pedestrian (V2P) communication in the vehicle to everything (V2X) communication scenario.

Here, the above-mentioned user devices may be considered as terminal devices in the following embodiments.

In some embodiments, the above wireless communication system may also include a network management device 130.

A number of base stations 120 are each connected to the network management device 130. The network management device 130 may be a core network device in the wireless communication system, for example, the network management device 130 may be a Mobility Management Entity (MME) in an Evolved Packet Core (EPC) network. Alternatively, the network management device may be another core network device, such as a Serving GateWay (SGW), Public Data Network GateWay (PGW), Policy and Charging Rules Function (PCRF), Home Subscriber Server (HSS), or the like. The implementation of the network management device 130 is not limited in the embodiments of the present disclosure.

In order to better understand the technical solution described in any of the embodiments of the present disclosure, a wireless communication scenario is firstly illustrated in an embodiment.

In the 5G system, an NTN is introduced.

Figure 2:
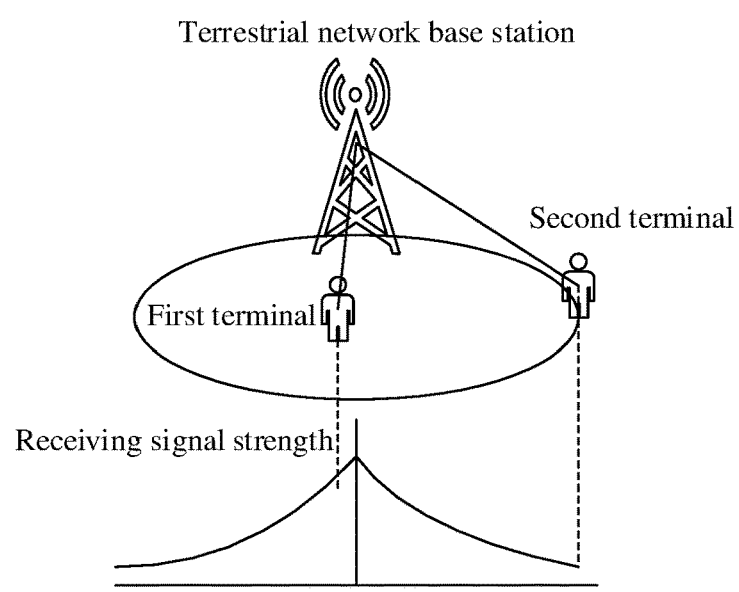
FIG. 2 is a schematic diagram of a wireless communication method according to an embodiment.
Figure 3:
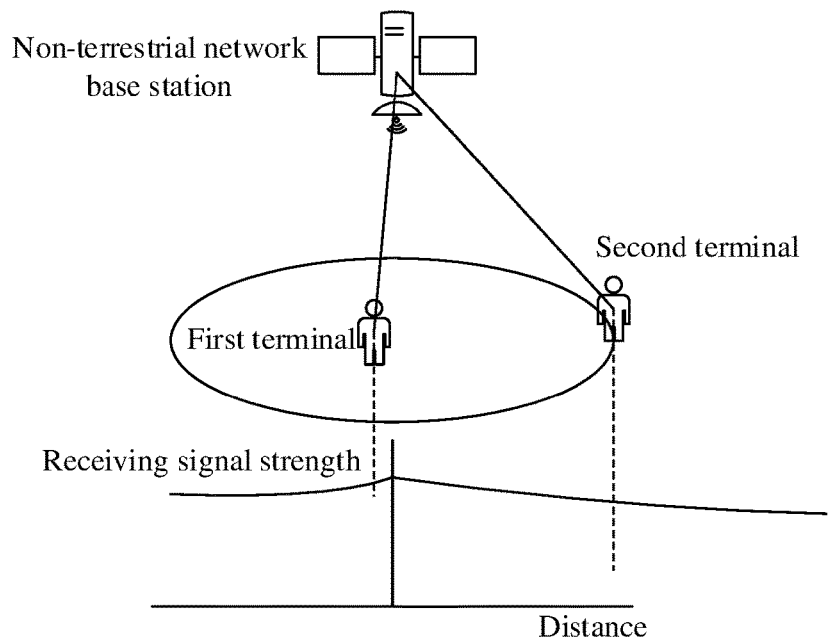
FIG. 3 is a schematic diagram of a wireless communication method according to an embodiment.

FIGS. 2 and 3 are schematic diagrams of near-far effect of received signal strengths of signals received by a terminal in different wireless communication scenarios.

In particular, FIG. 2 shows a schematic diagram of a received signal strength of a signal received by a terminal in a TN wireless communication scenario. The TN includes a terrestrial network base station and a terminal. FIG. 3 shows a schematic diagram of a received signal strength of a signal received by a terminal in an NTN wireless communication scenario. The NTN includes a non-terrestrial network base station and a terminal.

In an embodiment, in the TN system, the terminal may determine whether the terminal is at a cell edge according to a significant difference in RSRP between a cell center and the cell edge.

In an embodiment, in the TN system, the terminal may determine whether the terminal is at the cell edge according to a significant difference in reference signal receiving quality (RSRQ) between the cell center and the cell edge.

However, in the NTN where a cell radius is large, the difference in RSRP and that in RSRQ measured by the terminal are small regardless of whether the terminal is at the cell center or at the cell edge, and thus the near-far effect is not obvious. In addition, the large cell radius results in a large cell overlap area, which may cause "ping-pong" switching. Here, the "ping-pong" switching is a back-and-forth cell reselection between different cells.

In the 5G NR, the terminal selects or reselects the cell according to S and R criteria.

The S criterion is:

Srxlev>0 and Squal>0;

where Srxlev is a cell selection receiving value; and
Squal is a cell selection quality value.

When a terminal performs the cell selection or reselection, the S criterion needs to be satisfied.

Further, for intra-frequency measurement of the terminal, in response to that the service cell satisfies:

Srxlev>SintraSearchP and Squal>SintraSearchQ;

the terminal may choose not to perform measurement on the intra-frequency cell.

where SIntraSearchP is an RSRP signal level threshold for initiating the intra-frequency measurement; and
SIntraSearchQ is an RSRQ signal quality threshold for initiating the intra-frequency measurement.

In response to that the above condition is not satisfied, the terminal starts neighbor cell measurement and then selects a target cell according to the R criterion to complete the cell reselection.

The R criterion is $Rs = Q\text{meas·s} + Q\text{hyst} - Q\text{offset}_{temp}$; and $Rn = Q\text{meas·n} - Q\text{offset} - Q\text{offset}_{temp}$, where Rs is an R value of the service cell,
Rn is an R value of the neighbor cell,
Qmeas·s is an RSRP measurement value for the service cell,
Qmeas·n is an RSRP measurement value for the neighbor cell,
Qhyst is a cell reselection hysteresis value,
$Q\text{offset}_{temp}$ is a temporary offset value, and
Qoffset is an offset value.

The specific parameters are described in Table 1.

TABLE 1

| Parameter | Parameter description |
|---|---|
| $Q_{meas}$ | Reference signal receiving power RSRP value for cell reselection |
| Qoffset | For intra-frequency reselection, being equal to $Q\text{offset}_{s,n}$ if there is a valid inter-cell Qoffsets.n in a system broadcast, otherwise being equal to 0. For inter-frequency reselection, being equal to $Q\text{offset}_{s,n}$ plus $Q\text{offset}_{frequency}$ if there is a valid inter-cell $Q\text{offset}_{s,n}$ in the system broadcast, otherwise being equal to $Q\text{offset}_{frequency}$ |
| $Q\text{offset}_{temp}$ | Temporary offset, for a cell with failed connection establishment as specified in TS 38.331 |

For the NTN, since the near-far effect is not obvious, the cell reselection based on RSRP and/or RSRQ only may result in terminal reselecting back and forth between two cells, which is unreliable and may result in untimely cell reselection.

Figure 4:
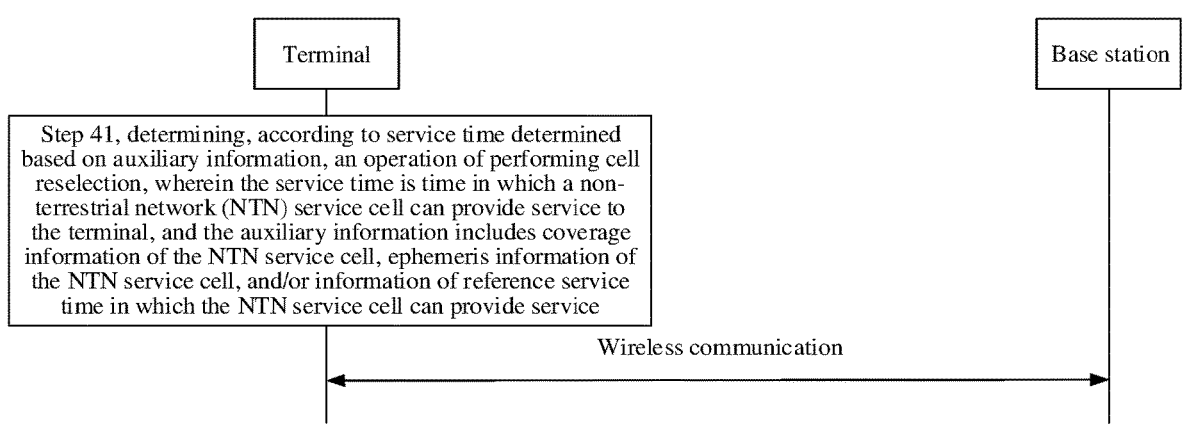
FIG. 4 is a schematic flow chart of a cell reselection method according to an embodiment.

As shown in FIG. 4, a cell reselection method is provided in an embodiment. The method is applied to a terminal and includes:
step 41, determining, according to service time determined based on auxiliary information, an operation of performing cell reselection,
wherein the service time is time in which a non-terrestrial network (NTN) service cell can provide service to the terminal, and the auxiliary information includes coverage information of the NTN service cell, ephemeris information of the NTN service cell, and/or information of reference service time in which the NTN service cell can provide service.

In some embodiments, the terminal may be, but is not limited to, a terminal such as a mobile phone, a wearable device, a vehicle-mounted terminal, a road side unit (RSU), a smart home terminal and an industrial sensing device.

Here, the NTN service cell may be a cell of a satellite in the NTN.

In an embodiment, the satellite may be a flying base station.

In an embodiment, the base station may be an access device for the terminal to access the NTN.

In some embodiments, the base station may be a variety of types of base stations.

For example, the base station may be a base station for the third generation mobile communication (3G) network, a base station for the fourth generation mobile communication (4G) network, a base station for the fifth generation mobile communication (5G) network or other evolved base stations.

In an embodiment, the cell of the satellite follows the movement of the satellite.

In an embodiment, the terminal has a relative speed to the NTN service cell.

In an embodiment, the terminal remains stationary relative to the ground and the NTN service cell moves along a fixed trajectory relative to the ground.

In an embodiment, the terminal moves relative to the ground and the NTN service cell moves along a fixed trajectory relative to the ground.

In an embodiment, the terminal moves in a diameter direction of the cell.

In an embodiment, the diameter direction is the same as the movement direction of the satellite.

In an embodiment, the terminal and the satellite may move in opposite or the same direction.

In an embodiment, the NTN service cell may be an NTN cell to which the terminal is currently connected. In this way, the terminal may communicate wirelessly in this NTN service cell.

In an embodiment, a coverage range of the NTN service cell may be a range of a ground area that can be covered by signal of the NTN service cell.

In an embodiment, the coverage information of the NTN service cell may include information about radius, diameter and/or area of the NTN service cell.

In an embodiment, the ephemeris information may be information associated with location and/or movement state of the satellite.

In an embodiment, at different moments in time, the ephemeris information may contain information with different parameter values.

For example, location information of the satellite may be different at different moments in time. Here, the location information may be location coordinates.

In an embodiment, the ephemeris information includes at least one of information about trajectory of the satellite, information about location of the satellite, information about movement velocity of the satellite and information about orbit altitude of the satellite.

In an embodiment, the information of the reference service time in which the NTN service cell can provide service may be information about maximum time length for which the NTN service cell can provide service.

In an embodiment, in a case where the terminal is located in a diameter direction of the NTN service cell and the satellite moves in the same direction as that diameter direction, the time for the satellite movement to cause the terminal to travel from one end of the diameter to the other end of the diameter is the maximum time length for which the NTN service cell can provide the service. Here, the two ends of the diameter may be the intersections of the straight line in which the diameter is located with the boundary of the NTN service cell.

In an embodiment, the maximum value of the service time may be taken to be that maximum time length.

In an embodiment, due to the movement of the satellite, the NTN service cell therefore can provide the terminal with a first time length of service. Here, the first time length is the service time in which the NTN service cell can provide service to the terminal. Furthermore, the service time provided by the NTN service cell to different terminals may be different since locations of the NTN service cell where the terminals are located are different.

In an embodiment, the reselection time for the terminal to perform the cell reselection in each cell may be determined according to a movement speed of the satellite and a cell size of a ground cell corresponding to the satellite. Here, the cell size may be a diameter or a radius.

In an embodiment, the information of the reference service time in which the NTN service cell can provide service may be obtained according to the movement speed of the satellite and the coverage distance of the ground cell corresponding to the satellite.

In an embodiment, the information of the reference service time in which the NTN service cell can provide service indicates a time length T of:

$$T = \frac{\text{cell size (km)}}{UE \text{ speed} \left(\frac{\text{km}}{\text{hr}}\right) \cdot \left(\frac{1 \text{ hr}}{3600 \text{ s}}\right) + \text{satellite speed} \left(\frac{\text{km}}{\text{s}}\right)}$$

Here, the cell size may be the cell size of the NTN service cell, the UE speed is the movement speed of the terminal, and the satellite speed is the movement speed of the satellite.

In an embodiment, the satellite moves at an orbital altitude of 600 km and the relationship between the diameter of the NTN service cell, the movement speed of the terminal, the movement speed of the satellite and the information of the reference service time is shown in Table 2.

TABLE 2

| Cell size (km) | Movement speed of terminal (km/hr) | Movement speed of satellite (km/s) | T(s) |
|---|---|---|---|
| 50 | +500 | 7.56 | 6.49 |
| | −500 | | 6.74 |
| | +1200 | | 6.33 |
| | −1200 | | 6.92 |
| | 0 | | 6.61 |
| 1000 | +500 | | 129.89 |
| | −500 | | 134.75 |
| | +1200 | | 126.69 |
| | −1200 | | 138.38 |
| | 0 | | 132.28 |

In an embodiment, the terminal receives the auxiliary message from the base station.

In an embodiment, the terminal may receive a system message or a radio resource control (RRC) message carrying the auxiliary information.

In an embodiment, the auxiliary information includes the information of the reference service time in which the NTN service cell can provide service.

In an embodiment, the auxiliary information does not include the information of the reference service time in which the NTN service cell can provide service.

In an embodiment, in response to that the auxiliary information does not include the information of the reference service time in which the NTN service cell can provide service, the base station determines the information of the reference service time in which the NTN service cell can provide service according to the coverage information and the ephemeris information of the NTN service cell.

In an embodiment, the auxiliary information includes the coverage information and the ephemeris information of the NTN service cell, but the auxiliary information does not include the information of the reference service time in which the NTN service cell can provide service.

In an embodiment, the terminal determines the information of the reference service time in which the NTN service cell can provide service according to the coverage information and the ephemeris information of the NTN service cell in the auxiliary information.

In an embodiment, the auxiliary information is pre-configured in the terminal.

In an embodiment, the terminal may be pre-configured with some of trajectory information of the satellite, location information of the satellite, movement speed information of the satellite and orbital altitude information of the satellite, cell size information of the NTN service cell and area information of the NTN service cell.

For example, the cell size information of the NTN service cell is pre-configured in the terminal.

In an embodiment, the auxiliary information may include pre-configured auxiliary information and received auxiliary information.

In an embodiment, the auxiliary information is stored in a storage area of the terminal.

In an embodiment, the auxiliary information is stored in a Universal Subscriber Identity Module (USIM) of the terminal.

In an embodiment, the auxiliary information is stored in an embedded Universal Subscriber Identity Module (eSIM, embedded-SIM).

In an embodiment, in response to that the service cell can provide service to the terminal in the service time, the operation of cell reselection may not be performed.

In an embodiment, in response to that the service cell cannot provide service to the terminal outside the service time, the operation of cell reselection may be performed.

In an embodiment, in response to that the terminal needs to perform the cell reselection and the network specifies a plurality of alternative target cells for reselection, the terminal performs a signal measurement on a neighbor cell, selects the alternative target cell with the highest R value as the target cell according to the R criterion, and performs the cell reselection according to that target cell.

In an embodiment, in response to that the terminal needs to perform the cell reselection and the network specifies one target cell for reselection, the terminal reselects to that target cell by the cell reselection.

In an embodiment, the service time is different from the time indicated by the information of the reference service time in which the NTN service cell can provide service.

In an embodiment, the service time is smaller than or equal to the time indicated by the information of the reference service time in which the NTN service cell can provide service.

In an embodiment, the service time is determined according to the time length indicated by the information of the reference service time in which the NTN service cell can provide service.

In an embodiment, the time length of the terminal crossing the cell along a diameter d1 of the service cell after entering the service cell by the cell reselection is a first time length T1. It is noted that here the time length indicated by the information of the reference service time in which the NTN service cell can provide service is T1.

Figure 10:
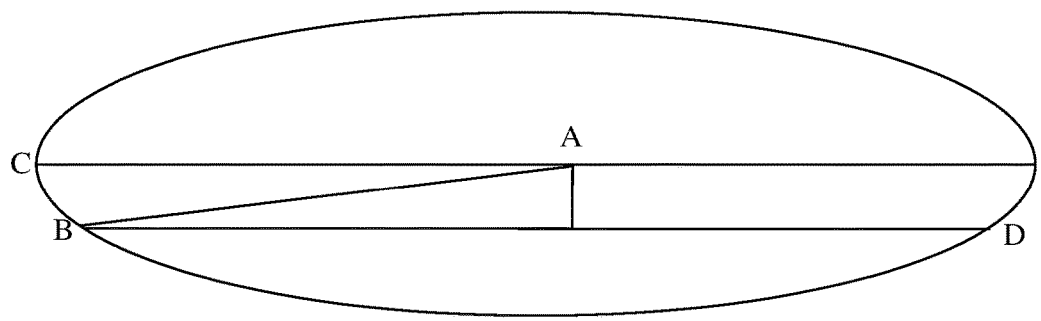
FIG. 10 is a schematic diagram of a method for determining service time according to an embodiment.

In an embodiment, referring to FIG. 10, the terminal is located at location B of the service cell, and in the diameter direction of the service cell (diameter d1), the distance between the location B and the edge of the NTN service cell is a first distance d2 (corresponding to BD in the figure), then the service time T2 may be determined according to a proportional relation between the first distance and the diameter of the service cell (d2/d1) and the time length T1 indicated by the information of the reference service time in which the NTN service cell can provide service, where:

$$T2 = T1 \times (d2/d1).$$

In an embodiment, in response to the terminal entering the service cell, the service time is determined according to the auxiliary information.

In an embodiment, in response to the terminal switching from a connected state to a non-connected state in the service cell, the service time is determined according to the auxiliary information.

In an embodiment, the non-connected state includes an RRC idle state and an RRC inactive state.

In an embodiment of the present disclosure, an operation of performing cell reselection is determined according to service time determined based on auxiliary information, the service time is time in which a non-terrestrial network (NTN) service cell can provide service to the terminal, and the auxiliary information includes coverage information of the NTN service cell, ephemeris information of the NTN service cell, and/or information of reference service time in which the NTN service cell can provide service. Here, the service time can be determined according to the auxiliary information, and the operation of performing the cell reselection is determined according to the service time in the NTN network, which reduces the influence of the insignificant near-far effect on the cell reselection in the NTN network in comparison with the way of determining the operation of performing the cell reselection by using signal quality measurements. Furthermore, the operation of performing the cell reselection can be adapted to the auxiliary information and the terminal can perform the cell reselection in a timely and reliable manner.

It is to be noted that a person skilled in the art may understand that the method provided by the embodiment of the present disclosure may be performed alone or together with some of the methods in the embodiments of the present disclosure or some of the methods in the related art.

Figure 5:
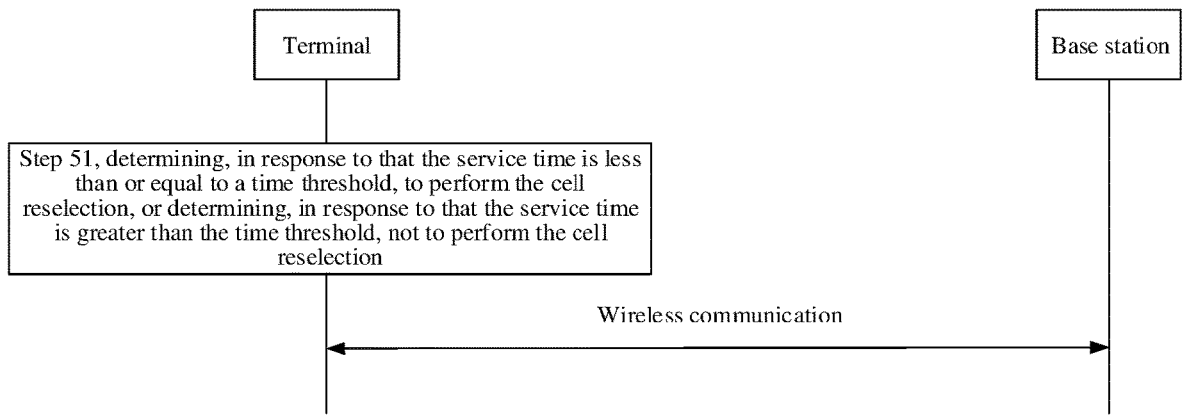
FIG. 5 is a schematic flow chart of a cell reselection method according to an embodiment.

As shown in FIG. 5, a cell reselection method is provided in an embodiment. The method is applied to a terminal, and the method includes:

step 51, determining, in response to that the service time is less than or equal to a time threshold, to perform the cell reselection; or determining, in response to that the service time is greater than the time threshold, not to perform the cell reselection.

In an embodiment, the time threshold is determined according to a requested time delay.

In an embodiment, in response to the requested time delay being less than a time delay threshold, the time threshold is determined to be greater than a value A.

In an embodiment, in response to the requested time delay being greater than the time delay threshold, the time threshold is determined to be less than the value A.

In this way, the time threshold may be adapted to the requested time delay.

In an embodiment, the terminal in the service cell may obtain the service time in which the service cell can provide service when the terminal is anywhere in the service cell.

In an embodiment, the auxiliary information sent by the base station via dedicated signaling is received.

In an embodiment, the auxiliary information sent by the base station via RRC signaling is received.

Here, this implementation is adapted to a scenario where the terminal switches from a connected state to a non-connected state.

In an embodiment, the auxiliary information sent by the base station via a system message is received.

Here, this implementation is adapted to a scenario where the terminal reselects into the NTN service cell.

In an embodiment, a timer is activated in response to the service time being determined. Here, a time length of the timer is that service time.

In an embodiment, in response to that the timer expires, the cell reselection is performed, and in response to that the timer does not expire, the cell reselection is not performed.

It is to be noted that a person skilled in the art may understand that the method provided by the embodiment of the present disclosure may be performed alone or together with some of the methods in the embodiments of the present disclosure or some of the methods in the related art.

Figure 6:
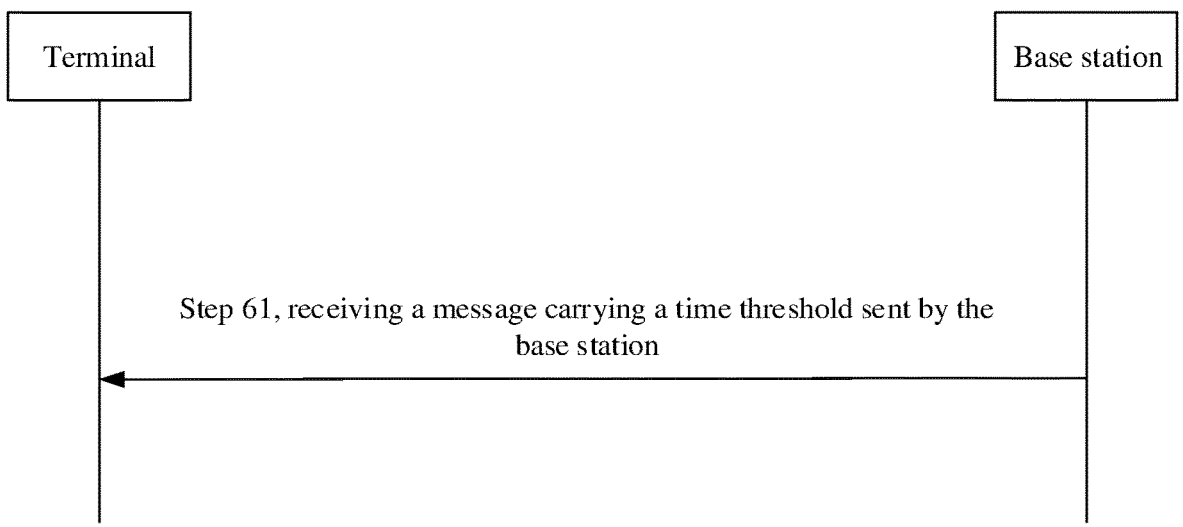
FIG. 6 is a schematic flow chart of a cell reselection method according to an embodiment.

As shown in FIG. 6, a cell reselection method is provided in an embodiment. The method is applied to a terminal, and the method includes:

step 61, receiving a message carrying a time threshold sent by the base station.

In an embodiment, an RRC message carrying the time threshold is received from the base station.

Here, this implementation is adapted to a scenario where the terminal switches from a connected state to a non-connected state.

In an embodiment, the auxiliary information sent by the base station via a system message is received.

Here, this implementation is adapted to a scenario where the terminal reselects into the NTN service cell.

It is to be noted that a person skilled in the art may understand that the method provided by the embodiment of the present disclosure may be performed alone or together with some of the methods in the embodiments of the present disclosure or some of the methods in the related art.

Figure 7:
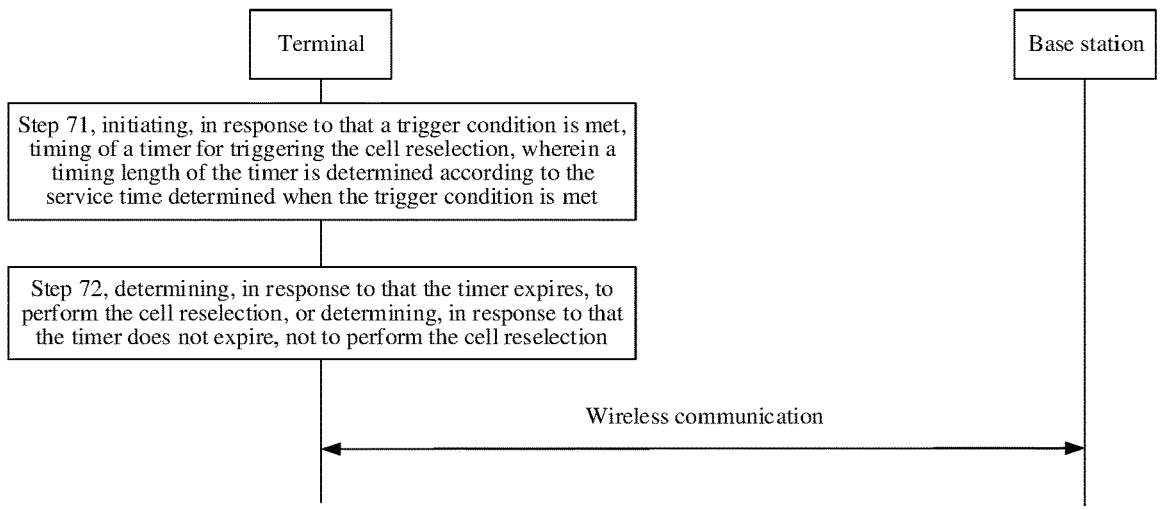
FIG. 7 is a schematic flow chart of a cell reselection method according to an embodiment.

As shown in FIG. 7, a cell reselection method is provided in an embodiment. The method is applied to a terminal, and the method includes:

step 71, initiating, in response to that a trigger condition is met, timing of a timer for triggering the cell reselection, wherein a timing length of the timer is determined according to the service time determined when the trigger condition is met; and step 72, determining, in response to that the timer expires, to perform the cell reselection, or determining, in response to that the timer does not expire, not to perform the cell reselection.

In an embodiment, the trigger condition may be that the terminal enters into the NTN service cell via the cell reselection.

In an embodiment, in response to that the terminal enters into the NTN service cell via the cell reselection, the service time may be determined to be a time length indicated by the information of reference service time in which the NTN service cell can provide service.

Here, it is to be noted that in an embodiment, the above implementation is subject to the following conditions:

the terminal initially entering into the NTN service cell via the cell reselection;

the terminal having a movement speed of 0 relative to the ground;

the terminal being located on the diameter of the coverage range of the NTN service cell; and the diameter direction in which the terminal is located is the same as the movement direction of the satellite.

In an embodiment, the trigger condition may be that the terminal switches from a connected state to a non-connected state in the NTN service cell. Here, the non-connected state includes an RRC idle state and an RRC inactive state.

In an embodiment, the service time determined when different trigger conditions are met may be different.

In an embodiment, the timing length of the timer is less than or equal to the service time determined when the trigger condition is met.

It is to be noted that a person skilled in the art may understand that the method provided by the embodiment of the present disclosure may be performed alone or together with some of the methods in the embodiments of the present disclosure or some of the methods in the related art.

Figure 8:
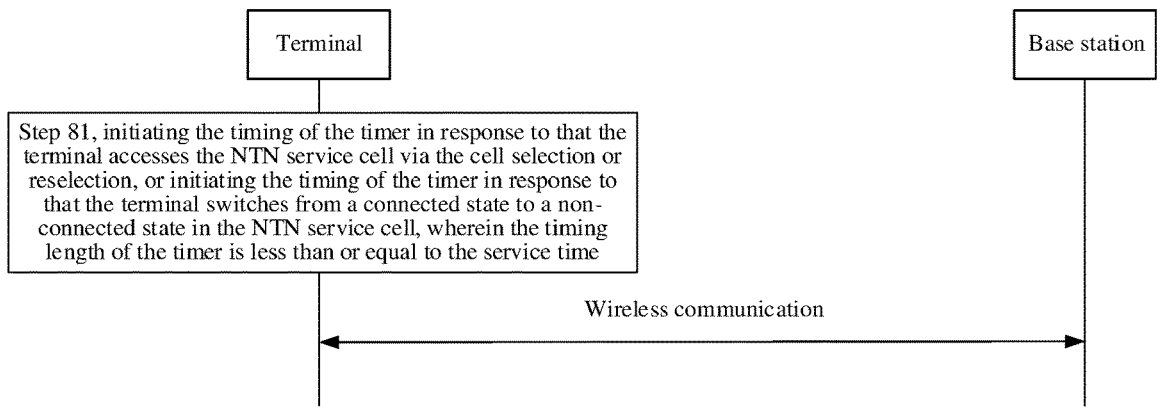
FIG. 8 is a schematic flow chart of a cell reselection method according to an embodiment.

As shown in FIG. 8, a cell reselection method is provided in an embodiment. The method is applied to a terminal, and the method includes:

step 81, initiating the timing of the timer in response to that the terminal accesses the NTN service cell via the cell reselection, or initiating the timing of the timer in response to that the terminal switches from a connected state to a non-connected state in the NTN service cell, wherein the timing length of the timer is less than or equal to the service time.

In an embodiment, the service time determined when different trigger conditions are met may be different.

In an embodiment, the timing length of the timer is less than or equal to the service time determined when the trigger condition is met.

In an embodiment, the non-connected state includes an RRC idle state or an RRC inactive state.

It is to be noted that a person skilled in the art may understand that the method provided by the embodiment of the present disclosure may be performed alone or together with some of the methods in the embodiments of the present disclosure or some of the methods in the related art.

Figure 9:
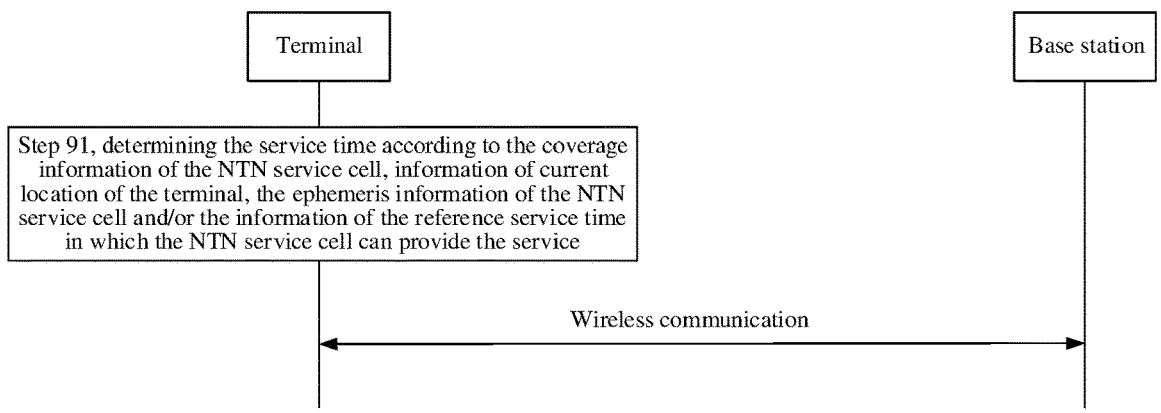
FIG. 9 is a schematic flow chart of a cell reselection method according to an embodiment.

As shown in FIG. 9, a cell reselection method is provided in an embodiment. The method is applied to a terminal, and the method includes:

step 91, determining the service time according to the coverage information of the NTN service cell, information of current location of the terminal, the ephemeris information of the NTN service cell and/or the information of the reference service time in which the NTN service cell can provide the service.

In an embodiment, the auxiliary information includes the information of the reference service time in which the NTN service cell can provide the service.

In an embodiment, in response to that the auxiliary information does not include the information of the reference service time in which the NTN service cell can provide the service, the base station determines the information of the reference service time in which the NTN service cell can provide the service according to the coverage information and the ephemeris information of the NTN service cell.

In an embodiment, the coverage information of the NTN service cell includes a cell size of the NTN service cell. Here, the cell size includes a diameter and/or a radius.

In an embodiment, the ephemeris information includes a movement speed of the satellite and/or an orbital altitude of the satellite.

In an embodiment, in response to that the terminal auxiliary information does not include the information of the reference service time in which the NTN service cell can provide the service, the information of the reference service time in which the NTN service cell can provide the service may be obtained according to the movement speed of the satellite and the diameter of the NTN service cell.

In an embodiment, the information of the reference service time in which the NTN service cell can provide the service indicates a time length T:

$$T = \frac{\text{cell size (km)}}{UE \text{ speed}\left(\frac{\text{km}}{\text{hr}}\right) \cdot \left(\frac{1 \text{ hr}}{3600 \text{ s}}\right) + \text{satellite speed}\left(\frac{\text{km}}{\text{s}}\right)}$$

Here, the cell size may be the diameter of the service cell, the UE speed is the movement speed of the terminal, and the satellite speed is the movement speed of the satellite.

In an embodiment, the diameter of the NTN service cell is R1, the distance of the terminal passing through the NTN service cell after entering the NTN service cell is R2, and m=R2/R1.

In an embodiment, the service time length X=m×T. Here, T is a time length corresponding to the reference service time in which the cell can provide the service. The auxiliary information does not carry T. Here, T may be determined by the terminal according to the coverage information and the ephemeris information of the NTN service cell.

In an embodiment, referring to FIG. 10, the terminal reselects into the NTN service cell, the location of the entry into the NTN service cell is B and the location of a reference point obtained by the terminal from the network is A. The terminal determines that a distance from a current location to the reference point is L (i.e., distance AB) and determines that the angle between the connection line to the reference point and the horizontal direction (AC direction) is a, i.e., ∠BAC=α, then m=2×L×cos α/R1.

Figure 11:
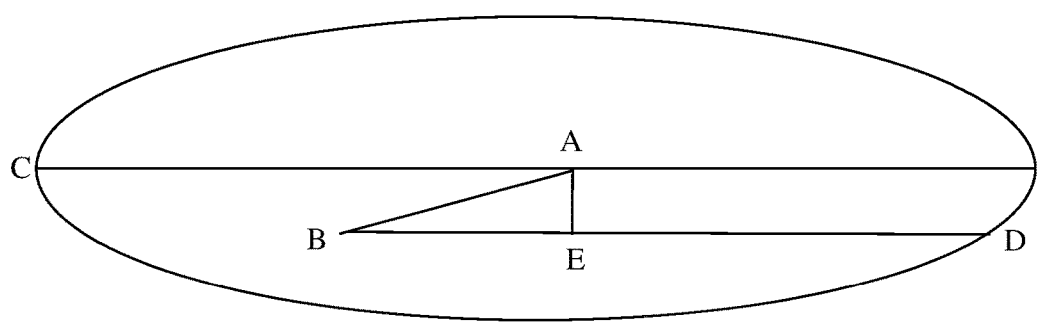
FIG. 11 is a schematic diagram of a method for determining service time according to an embodiment.

In an embodiment, referring to FIG. 11, the terminal enters an idle or inactive state from a connected state in the NTN service cell, i.e., the terminal enters the idle or inactive state at the location B. The terminal obtains the reference point from the network as A. Then the terminal determines that the distance between the terminal and the reference point is L (distance AB), and the terminal determines that the angle between the line connecting the terminal to the reference point and the horizontal direction (AC direction) is α, i.e., ∠BAC=α. Then the distance AE is L*sin α, and the distance ED is: sqrt((R1/2)²−(L×sin α)²).

In an embodiment, if α is less than or equal to π/2, m=(L×cos α+sqrt((R1/2)²−(L×sin α)²))/R1.

In an embodiment, if α is greater than π/2, m=(sqrt((R1/2)²−(L×sin α)²)−L×sin(π/2−α))/R1.

Here, it is to be noted that $$sqrt((R1/2)^2 - (L \times \sin\alpha)^2) = \sqrt{\left(\frac{R1}{2}\right)^2 - (L \times \sin\alpha)^2}.$$

It is to be noted that a person skilled in the art may understand that the method provided by the embodiment of the present disclosure may be performed alone or together with some of the methods in the embodiments of the present disclosure or some of the methods in the related art.

Figure 12:
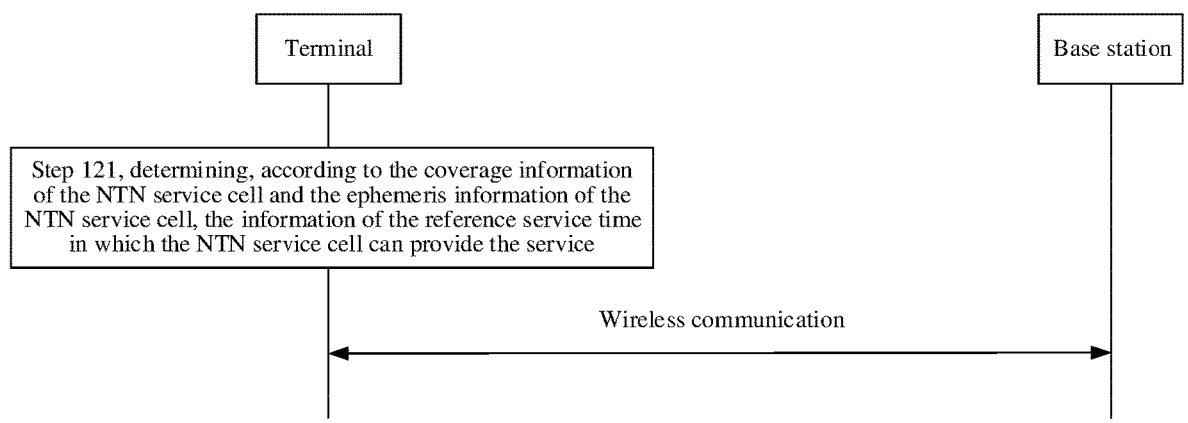
FIG. 12 is a schematic flow chart of a cell reselection method according to an embodiment.

As shown in FIG. 12, a cell reselection method is provided in an embodiment. The method is applied to a terminal, and the method includes:
  step 121, determining, according to the coverage information of the NTN service cell and the ephemeris information of the NTN service cell, the information of the reference service time in which the NTN service cell can provide the service.

It is to be noted that a person skilled in the art may understand that the method provided by the embodiment of the present disclosure may be performed alone or together with some of the methods in the embodiments of the present disclosure or some of the methods in the related art.

Figure 13:
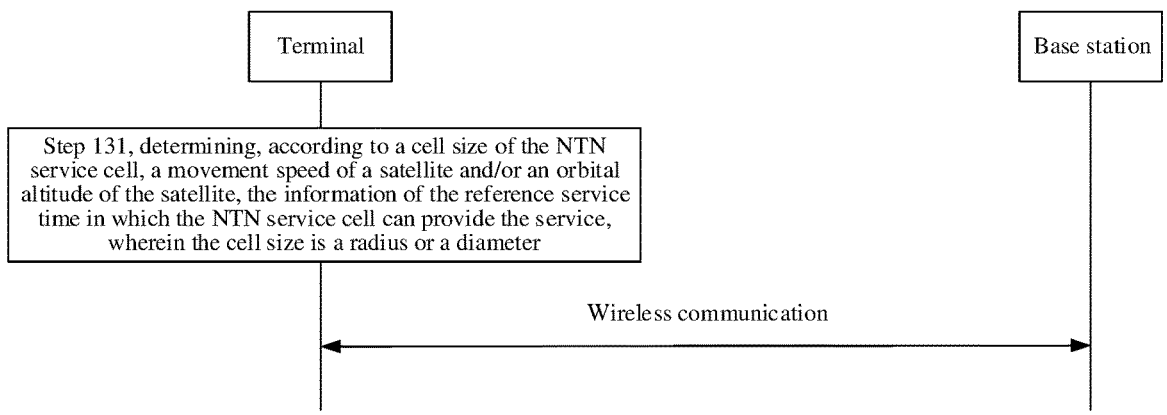
FIG. 13 is a schematic flow chart of a cell reselection method according to an embodiment.

As shown in FIG. 13, a cell reselection method is provided in an embodiment. The method is applied to a terminal, and the method includes:
  step 131, determining, according to a cell size of the NTN service cell, a movement speed of a satellite and/or an orbital altitude of the satellite, the information of the reference service time in which the NTN service cell can provide the service, wherein the cell size is a radius or a diameter.

In an embodiment, the cell size of the NTN service cell may be the diameter or radius of the NTN service cell.

In an embodiment, the coverage information of the NTN service cell includes the diameter and/or the radius of the NTN service cell.

In an embodiment, the ephemeris information includes the movement speed of the satellite and the orbital altitude of the satellite.

It is to be noted that a person skilled in the art may understand that the method provided by the embodiment of the present disclosure may be performed alone or together with some of the methods in the embodiments of the present disclosure or some of the methods in the related art.

Figure 14:
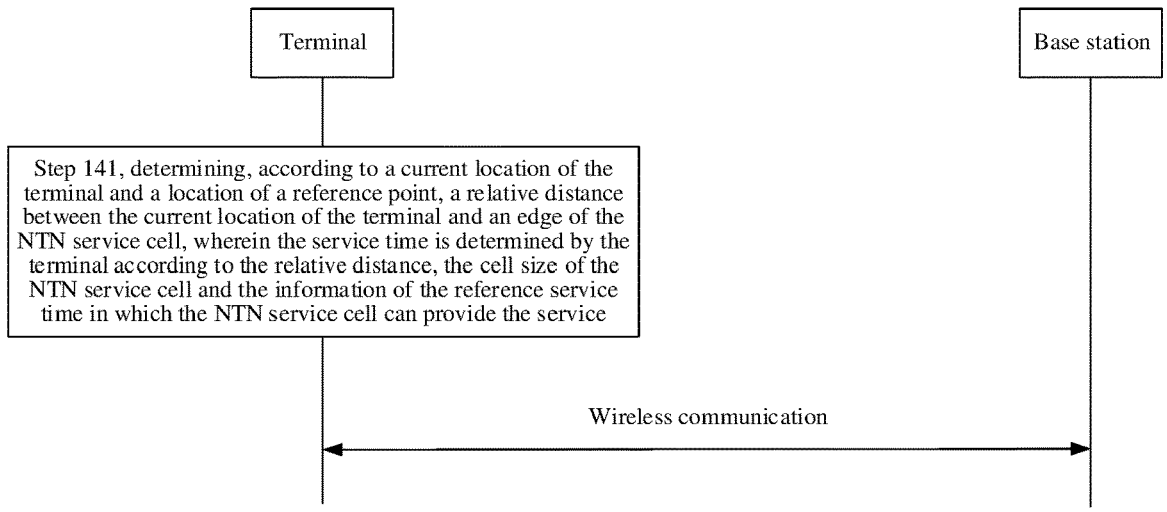
FIG. 14 is a schematic flow chart of a cell reselection method according to an embodiment.

As shown in FIG. 14, a cell reselection method is provided in an embodiment. The method is applied to a terminal, and the method includes:
  step 141, determining, according to a current location of the terminal and a location of a reference point, a relative distance between the current location of the terminal and an edge of the NTN service cell, wherein the service time is determined by the terminal according to the relative distance, the cell size of the NTN service cell and the information of the reference service time in which the NTN service cell can provide the service.

In an embodiment, the timing of the timer for triggering the cell reselection is initiated, and a timing length of the timer is determined according to the service time determined when the trigger condition is satisfied.

In an embodiment, in response to that the timer expires, the cell reselection is determined to be performed, or in response to that the timer does not expire, the cell reselection is determined not to be performed.

In an embodiment, the service time length X=m×T. Here, T is a time length corresponding to the reference service time in which the cell can provide the service. The auxiliary information carries T. Here, T may be determined by a network side according to the coverage information and the ephemeris information of the NTN service cell.

In an embodiment, referring to FIG. 10 again, the location of the terminal is B and the location of a reference point obtained by the terminal from the network is A. The terminal determines that a relative distance between a current location and the reference point is L (i.e., distance AB) and determines that the angle between the connection line to the reference point and the horizontal direction (AC direction) is α, i.e., ∠BAC=α, then m=2×L×cos α/R1. The service time is equal to m multiplied by the information of reference service time in which the NTN service cell can provide service.

In an embodiment, referring to FIG. 11 again, the location of the terminal is B and the location of a reference point obtained by the terminal from the network is A. Then the terminal determines that the relative distance between the terminal and the reference point is L (distance AB), and the terminal determines that the angle between the line connecting the terminal to the reference point and the horizontal direction (AC direction) is a, i.e., ∠BAC=α. Then the distance AE is L×sin α, and the distance ED is: sqrt((R1/2)²−(L×sin α)²). The service time is equal to m multiplied by the information of reference service time in which the NTN service cell can provide service.

In an embodiment, if α is less than or equal to π/2, m=(L×cos α+sqrt((R1/2)²−(L×sin α)²))/R1.

In an embodiment, if α is greater than π/2, m=(sqrt((R1/2)²−(L×sin α)²)−L×sin(π/2−α))/R1.

Here, it is to be noted that $$sqrt((R1/2)^2 - (L \times \sin\alpha)^2) = \sqrt{\left(\frac{R1}{2}\right)^2 - (L \times \sin\alpha)^2}.$$

It is to be noted that a person skilled in the art may understand that the method provided by the embodiment of the present disclosure may be performed alone or together with some of the methods in the embodiments of the present disclosure or some of the methods in the related art.

Figure 15:
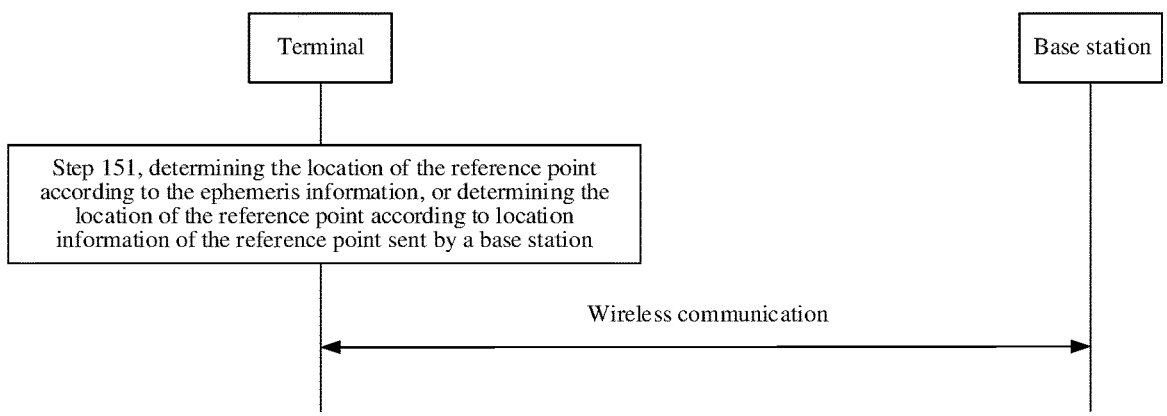
FIG. 15 is a schematic flow chart of a cell reselection method according to an embodiment.

As shown in FIG. 15, a cell reselection method is provided in an embodiment. The method is applied to a terminal, and the method includes:

step 151, determining the location of the reference point according to the ephemeris information, or determining the location of the reference point according to location information of the reference point sent by a base station.

In an embodiment, the location of the reference point may be the center of the NTN service cell. Referring to FIG. 10, the reference point may be point A.

In an embodiment, the coordinate information of the reference point may be calculated according to parameter information included in the ephemeris information.

In an embodiment, a message carrying the coordinate information of the reference point may be received from the satellite.

It is to be noted that a person skilled in the art may understand that the method provided by the embodiment of the present disclosure may be performed alone or together with some of the methods in the embodiments of the present disclosure or some of the methods in the related art.

Figure 16:
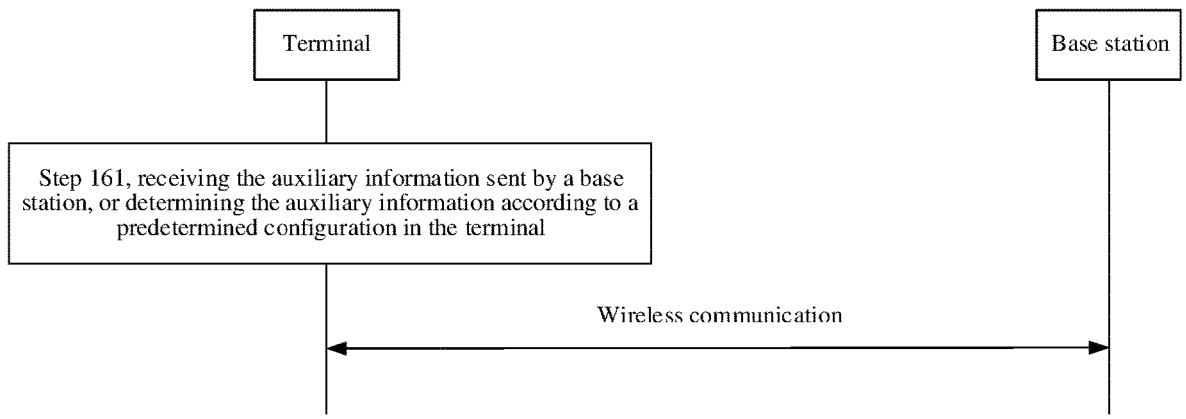
FIG. 16 is a schematic flow chart of a cell reselection method according to an embodiment.

As shown in FIG. 16, a cell reselection method is provided in an embodiment. The method is applied to a terminal, and the method includes:

step 161, receiving the auxiliary information sent by a base station, or determining the auxiliary information according to a predetermined configuration in the terminal.

In an embodiment, the terminal receives the auxiliary information sent by the base station.

In an embodiment, the terminal may receive a system message or a radio resource control (RRC) message carrying the auxiliary information.

In an embodiment, the auxiliary information includes the information of reference service time in which the NTN service cell can provide service.

In an embodiment, in response to that the auxiliary information does not include the information of reference service time in which the NTN service cell can provide service, the base station determines the information of reference service time in which the NTN service cell can provide service according to the coverage information and the ephemeris information of the NTN service cell.

In an embodiment, the auxiliary information includes the coverage information and the ephemeris information of the NTN service cell, but the auxiliary information does not include information of reference service time in which the NTN service cell can provide service.

In an embodiment, the terminal determines information of reference service time in which the NTN service cell can provide service according to the coverage information and the ephemeris information of the NTN service cell in the auxiliary information.

In an embodiment, the auxiliary information is pre-configured in the terminal.

In an embodiment, the auxiliary information is stored in a storage area of the terminal.

In an embodiment, the auxiliary information is stored in a USIM of the terminal.

In an embodiment, the auxiliary information is stored in an eSIM.

It is to be noted that a person skilled in the art may understand that the method provided by the embodiment of the present disclosure may be performed alone or together with some of the methods in the embodiments of the present disclosure or some of the methods in the related art.

Figure 17:
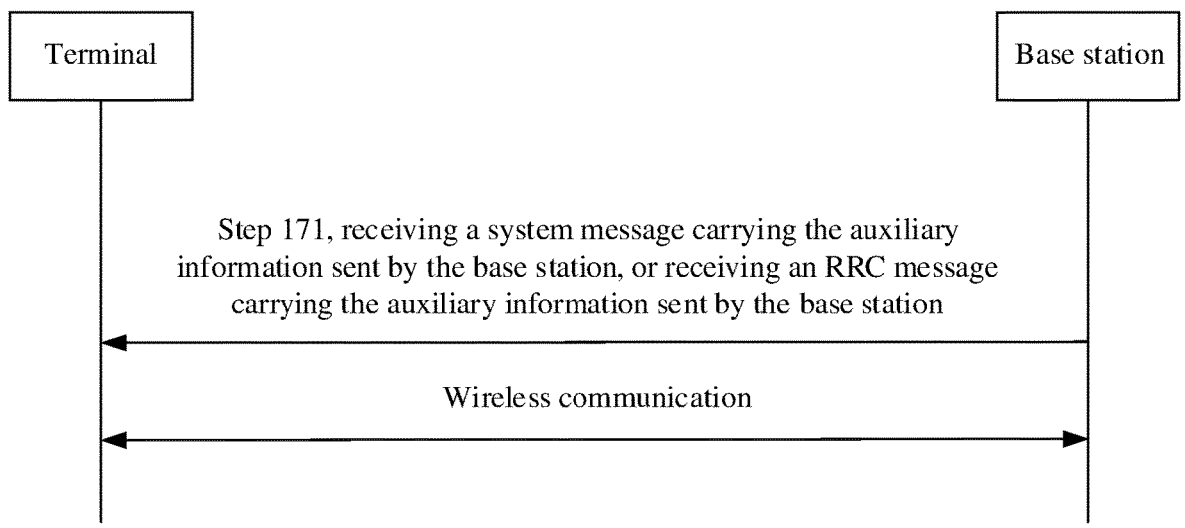
FIG. 17 is a schematic flow chart of a cell reselection method according to an embodiment.

As shown in FIG. 17, a cell reselection method is provided in an embodiment. The method is applied to a terminal, and the method includes:

step 171, receiving a system message carrying the auxiliary information sent by the base station, or receiving an RRC message carrying the auxiliary information sent by the base station.

In an embodiment, in response to that the terminal establishes an RRC connection with the base station, the RRC message carrying the auxiliary information sent by the base station is received.

In an embodiment, in response to that the terminal enters the NTN service cell, the RRC message carrying the auxiliary information is received from the base station.

It is to be noted that a person skilled in the art may understand that the method provided by the embodiment of the present disclosure may be performed alone or together with some of the methods in the embodiments of the present disclosure or some of the methods in the related art.

Figure 18:
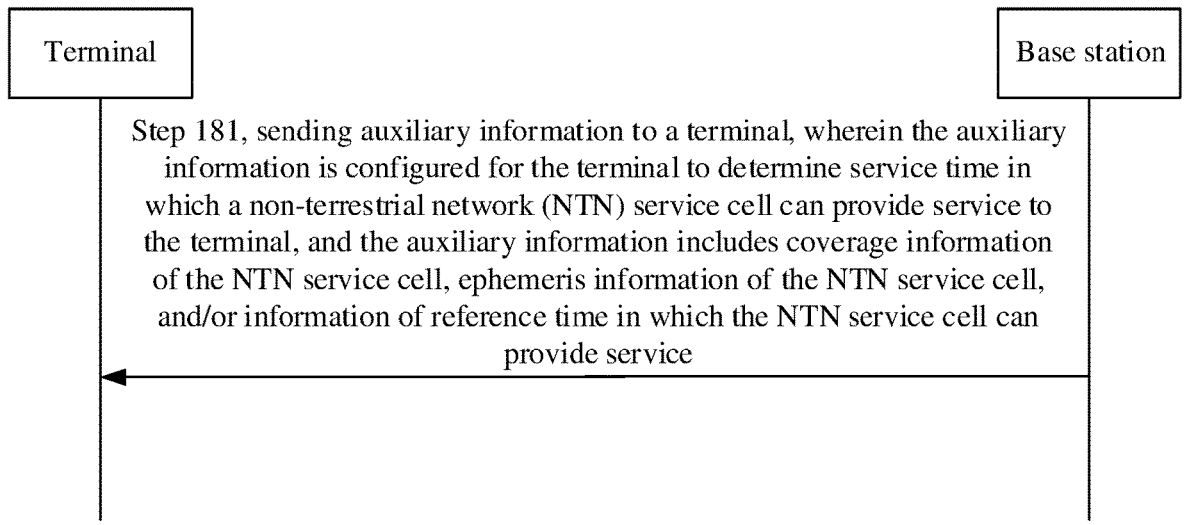
FIG. 18 is a schematic flow chart of a cell reselection method according to an embodiment.

As shown in FIG. 18, a cell reselection method is provided in an embodiment of the present disclosure. The method is applied to a base station, and the method includes:

step 181, sending auxiliary information to a terminal, wherein the auxiliary information is configured for the terminal to determine service time in which a non-terrestrial network (NTN) service cell can provide service to the terminal, and the auxiliary information includes coverage information of the NTN service cell, ephemeris information of the NTN service cell, and/or information of reference time in which the NTN service cell can provide service.

In some embodiments, the terminal may be, but is not limited to, a terminal such as a mobile phone, a wearable device, a vehicle-mounted terminal, a road side unit (RSU), a smart home terminal and an industrial sensing device.

Here, the NTN service cell may be a cell of a satellite in the NTN.

In an embodiment, the satellite may be a flying base station.

In an embodiment, the base station may be an access device for the terminal to access the NTN.

In some embodiments, the base station may be a variety of types of base stations.

For example, the base station may be a base station for the third generation mobile communication (3G) network, a base station for the fourth generation mobile communication (4G) network, a base station for the fifth generation mobile communication (5G) network or other evolved base stations.

In an embodiment, the cell of the satellite follows the movement of the satellite.

In an embodiment, the terminal has a relative speed to the NTN service cell.

In an embodiment, the terminal remains stationary relative to the ground and the NTN service cell moves along a fixed trajectory relative to the ground.

In an embodiment, the terminal moves relative to the ground and the NTN service cell moves along a fixed trajectory relative to the ground.

In an embodiment, the terminal moves in a diameter direction of the cell.

In an embodiment, the diameter direction is the same as the movement direction of the satellite.

In an embodiment, the terminal and the satellite may move in opposite direction.

In an embodiment, the terminal and the satellite may move in the same direction.

In an embodiment, the NTN service cell may be an NTN cell to which the terminal is currently connected. In this way, the terminal may communicate wirelessly in this NTN service cell.

In an embodiment, a coverage range of the NTN service cell may be a range of a ground area that can be covered by signal of the NTN service cell.

In an embodiment, the coverage information of the NTN service cell may include information about radius, diameter and/or area of the NTN service cell.

In an embodiment, the ephemeris information may be information associated with location and/or movement state of the satellite.

In an embodiment, at different moments in time, the ephemeris information may contain information with different parameter values.

For example, location information of the satellite may be different at different moments in time.

In an embodiment, the ephemeris information includes at least one of information about trajectory of the satellite, information about location of the satellite, information about movement velocity of the satellite and information about orbit altitude of the satellite.

In an embodiment, the information of the reference service time in which the NTN service cell can provide service may be information about maximum time length for which the NTN service cell can provide service.

In an embodiment, in a case where the terminal is located in a diameter direction of the NTN service cell and the satellite moves in the same direction as that diameter direction, the time for the satellite movement to cause the terminal to travel from one end of the diameter to the other end of the diameter is the maximum time length for which the NTN service cell can provide the service. Here, the two ends of the diameter may be the intersections of the straight line in which the diameter is located with the boundary of the NTN service cell.

In an embodiment, the maximum value of the service time may be taken to be that maximum time length.

In an embodiment, due to the movement of the satellite, the NTN service cell therefore can provide the terminal with a first time length of service. Here, the first time length is the service time in which the NTN service cell can provide service to the terminal. Furthermore, the service time provided by the NTN service cell to different terminals may be different since locations of the NTN service cell where the terminals are located are different.

In an embodiment, the reselection time for the terminal to perform the cell reselection in each cell may be determined according to a movement speed of the satellite and a cell size of a ground cell corresponding to the satellite. Here, the cell size may be a diameter or a radius.

In an embodiment, after the terminal has entered the cell via the cell reselection for the time length indicated by the information of the reference service time, the terminal is to perform the cell reselection.

In an embodiment, the information of the reference service time in which the NTN service cell can provide service may be obtained according to the movement speed of the satellite and the coverage distance of the ground cell corresponding to the satellite.

In an embodiment, the information of the reference service time in which the NTN service cell can provide service indicates a time length T of:

$$T = \frac{\text{cell size (km)}}{UE \text{ speed} \left(\frac{\text{km}}{\text{hr}}\right) \cdot \left(\frac{1 \text{ hr}}{3600 \text{ s}}\right) + \text{satellite speed} \left(\frac{\text{km}}{\text{s}}\right)}$$

Here, the cell size may be the cell size of the NTN service cell, the UE speed is the movement speed of the terminal, and the satellite speed is the movement speed of the satellite.

In an embodiment, the satellite moves at an orbital altitude of 600 km and the relationship between the diameter of the NTN service cell, the movement speed of the terminal, the movement speed of the satellite and the information of the reference service time is shown in Table 2.

In an embodiment, the base station sends the auxiliary message to the terminal.

In an embodiment, the base station sends a system message or a radio resource control (RRC) message carrying the auxiliary information to the terminal.

In an embodiment, the auxiliary information includes the information of the reference service time in which the NTN service cell can provide service.

In an embodiment, in response to that the auxiliary information does not include the information of the reference service time in which the NTN service cell can provide service, the base station determines the information of the reference service time in which the NTN service cell can provide service according to the coverage information and the ephemeris information of the NTN service cell.

In an embodiment, the auxiliary information includes the coverage information and the ephemeris information of the NTN service cell, but the auxiliary information does not include the information of the reference service time in which the NTN service cell can provide service.

In an embodiment, the terminal determines the information of the reference service time in which the NTN service cell can provide service according to the coverage information and the ephemeris information of the NTN service cell in the auxiliary information.

In an embodiment, in response to that the service cell can provide service to the terminal in the service time, the operation of cell reselection may not be performed.

In an embodiment, in response to that the service cell cannot provide service to the terminal outside the service time, the operation of cell reselection may be performed.

In an embodiment, in response to that the terminal needs to perform the cell reselection and the network specifies a plurality of alternative target cells for reselection, the terminal performs a signal measurement on a neighbor cell, selects the alternative target cell with the highest R value as the target cell according to the R criterion, and performs the cell reselection according to that target cell.

In an embodiment, in response to that the terminal needs to perform the cell reselection and the network specifies one target cell for reselection, the terminal reselects to that target cell by the cell reselection.

In an embodiment, the service time is different from the time indicated by the information of the reference service time in which the NTN service cell can provide service.

In an embodiment, the service time is smaller than or equal to the time length indicated by the information of the reference service time in which the NTN service cell can provide service.

In an embodiment, the service time is determined according to the time indicated by the information of the reference service time in which the NTN service cell can provide service.

In an embodiment, the time length of the terminal crossing the cell along a diameter d1 of the service cell after entering the service cell by the cell reselection is a first time length T1. It is to be noted that here the time length indicated by the information of the reference service time in which the NTN service cell can provide service is T1.

In an embodiment, referring to FIG. 10, the terminal is located at location B of the service cell, and in the diameter direction of the service cell (diameter d1), the distance between the location B and the edge of the NTN service cell is a first distance d2 (corresponding to BD in the figure), then the service time T2 may be determined according to a proportional relation between the first distance and the diameter of the service cell (d2/d1) and the time length T1 indicated by the information of the reference service time in which the NTN service cell can provide service, where:

$$T2=T1\times(d2/d1).$$

In an embodiment, in response to the terminal entering the service cell, the service time is determined by the terminal according to the auxiliary information.

In an embodiment, in response to the terminal switching from a connected state to a non-connected state in the service cell, the service time is determined by the terminal according to the auxiliary information.

In an embodiment, the non-connected state includes an RRC idle state and an RRC inactive state.

In an embodiment of the present disclosure, an operation of performing cell reselection is determined according to service time determined based on auxiliary information, the service time is time in which a non-terrestrial network (NTN) service cell can provide service to the terminal, and the auxiliary information includes coverage information of the NTN service cell, ephemeris information of the NTN service cell, and/or information of reference service time in which the NTN service cell can provide service. Here, the service time can be determined according to the auxiliary information, and the operation of performing the cell reselection is determined according to the service time in the NTN network, which reduces the influence of the insignificant near-far effect on the cell reselection in the NTN network in comparison with the way of determining the operation of performing the cell reselection by using signal quality measurements. Furthermore, the operation of performing the cell reselection can be adapted to the auxiliary information and the terminal can perform the cell reselection in a timely and reliable manner.

It is to be noted that a person skilled in the art may understand that the method provided by the embodiment of the present disclosure may be performed alone or together with some of the methods in the embodiments of the present disclosure or some of the methods in the related art.

Figure 19:
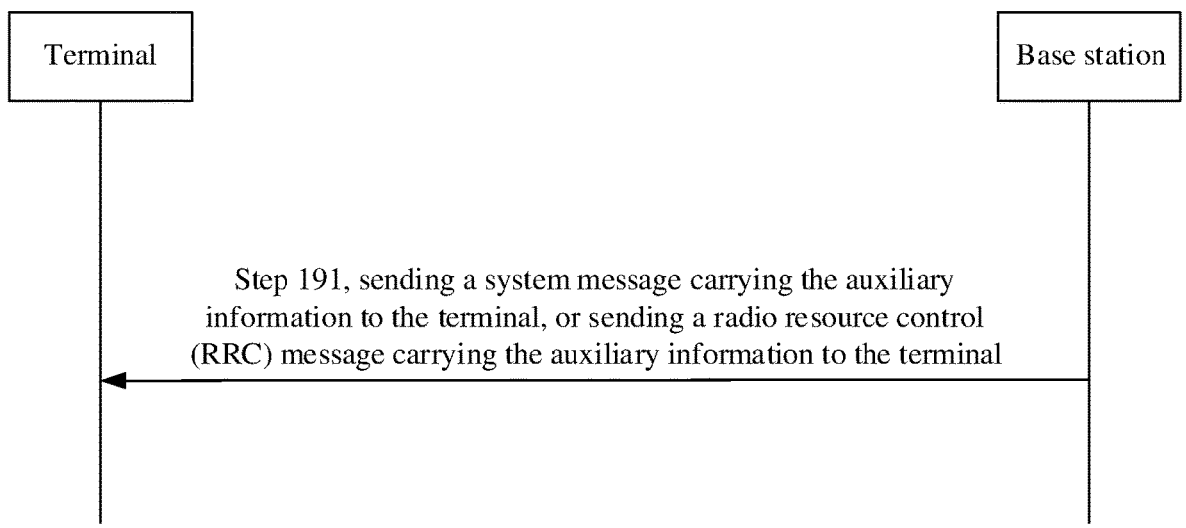
FIG. 19 is a schematic flow chart of a cell reselection method according to an embodiment.

As shown in FIG. 19, a cell reselection method is provided in an embodiment of the present disclosure. The method is applied to a base station, and the method includes:

step 191, sending a system message carrying the auxiliary information to the terminal, or sending a radio resource control (RRC) message carrying the auxiliary information to the terminal.

In an embodiment, the base station sends the auxiliary information to the terminal via RRC signaling.

Here, this implementation is adapted to a scenario where the terminal switches from a connected state to a non-connected state.

In an embodiment, the base station sends the auxiliary information to the terminal via the system message.

Here, this implementation is adapted to a scenario where the terminal reselects into the NTN service cell.

It is to be noted that a person skilled in the art may understand that the method provided by the embodiment of the present disclosure may be performed alone or together with some of the methods in the embodiments of the present disclosure or some of the methods in the related art.

Figure 20:
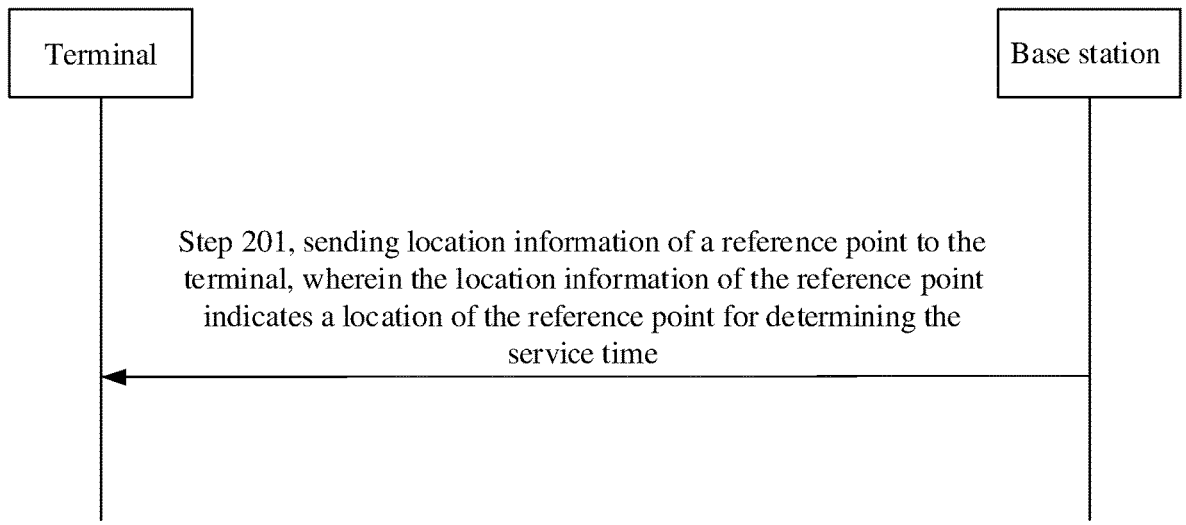
FIG. 20 is a schematic flow chart of a cell reselection method according to an embodiment.

As shown in FIG. 20, a cell reselection method is provided in an embodiment of the present disclosure. The method is applied to a base station, and the method includes:

step 201, sending location information of a reference point to the terminal, wherein the location information of the reference point indicates a location of the reference point for determining the service time.

In an embodiment, the timing of the timer for triggering the cell reselection is initiated, and a timing length of the timer is determined according to the service time determined when the trigger condition is satisfied.

In an embodiment, in response to that the timer expires, the cell reselection is determined to be performed, or in response to that the timer does not expire, the cell reselection is determined not to be performed.

In an embodiment, the service time length X=m×T. Here, T is a time length corresponding to the reference service time in which the cell can provide the service. The auxiliary information carries T. Here, T may be determined by a network side according to the coverage information and the ephemeris information of the NTN service cell.

In an embodiment, referring to FIG. 10 again, the location of the terminal is B and the location of a reference point obtained by the terminal from the network is A. The terminal determines that a relative distance between a current location and the reference point is L (i.e., distance AB) and determines that the angle between the connection line to the reference point and the horizontal direction (AC direction) is α, i.e., ∠BAC=α, then m=2*L*cos α/R1. The service time is equal to m multiplied by the information of reference service time in which the NTN service cell can provide service.

In an embodiment, referring to FIG. 11 again, the location of the terminal is B and the location of a reference point obtained by the terminal from the network is A. Then the terminal determines that the relative distance between the terminal and the reference point is L (distance AB), and the terminal determines that the angle between the line connecting the terminal to the reference point and the horizontal direction (AC direction) is a, i.e., ∠BAC=α. Then the distance AE is L*sin α, and the distance ED is: sqrt((R1/2)²−(L×sin α)²). The service time is equal to m multiplied by the information of reference service time in which the NTN service cell can provide service.

In an embodiment, if α is less than or equal to π/2, m=(L×cos α+sqrt((R1/2)²−(L×sin α)²))/R1.

In an embodiment, if α is greater than π/2, m=(sqrt((R1/2)²−(L×sin α)²)−L×sin(π/2−α))/R1.

Here, it is to be noted that $$sqrt((R1/2)^2 - (L \times \sin\alpha)^2) = \sqrt{\left(\frac{R1}{2}\right)^2 - (L \times \sin\alpha)^2}.$$

It is to be noted that a person skilled in the art may understand that the method provided by the embodiment of the present disclosure may be performed alone or together with some of the methods in the embodiments of the present disclosure or some of the methods in the related art.

Figure 21:
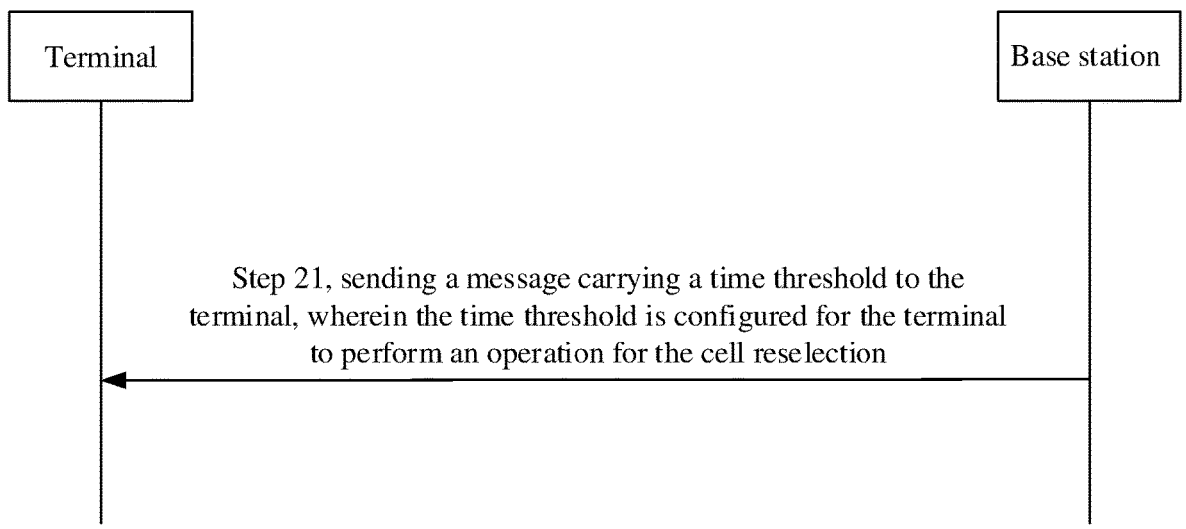
FIG. 21 is a schematic flow chart of a cell reselection method according to an embodiment.

As shown in FIG. 21, a cell reselection method is provided in an embodiment of the present disclosure. The method is applied to a base station, and the method includes:
step 21, sending a message carrying a time threshold to the terminal, wherein the time threshold is configured for the terminal to perform an operation for the cell reselection.

In an embodiment, the time threshold is determined according to a requested time delay.

In an embodiment, in response to the requested time delay being less than a time delay threshold, the time threshold is determined to be greater than a value A.

In an embodiment, in response to the requested time delay being greater than the time delay threshold, the time threshold is determined to be less than the value A.

In this way, the time threshold may be adapted to the requested time delay.

In an embodiment, a timer is activated in response to the service time being determined. Here, a time length of the timer is that service time.

In an embodiment, in response to that the timer expires, the cell reselection is performed, and in response to that the timer does not expire, the cell reselection is not performed.

It is to be noted that a person skilled in the art may understand that the method provided by the embodiment of the present disclosure may be performed alone or together with some of the methods in the embodiments of the present disclosure or some of the methods in the related art.

In order to facilitate the understanding of embodiments of the present disclosure, the technical solutions of the present disclosure are illustrated by means of embodiments below.

Example 1, refer to FIG. 10 again.

The terminal is in a stationary state relative to the ground and the signals of cell 1, cell 2 and cell 3 of a moving satellite in the NTN network cover the terminal in turn.

Example 1 discloses a cell reselection method, including the following steps.

In step a1, the terminal is in the NTN cell 1 and enters the NTN cell 2 via the cell reselection.

For example, the terminal enters the cell 2 via the cell reselection, the terminal performs the cell reselection at location B, and the terminal is at the location B in FIG. 10.

In step b1, the terminal reads a system message broadcasted by the NTN service cell, obtains auxiliary information from the system message, and determines, according to the auxiliary information, the service time in which the NTN service cell can provide service to the terminal.

The auxiliary information includes coverage information (e.g., diameter L) of the NTN service cell and a service reference time T.

In step c1, the terminal further obtains, from the network, location information of a reference point, i.e., the location information of point A in FIG. 10.

In step d1, the terminal obtains location information of the terminal, i.e., the location information of point B in FIG. 10 as described above.

In step e1, the terminal determines, according to the above information, a movement (relative movement) distance of the terminal to point D (cell edge) as x1.

In step f1, the terminal determines, according to the above information, the service time in which the serving cell can provide service to the terminal as T1=x1/L*T.

In step g1, the terminal determines T1 by the above steps immediately after entering the cell 2 and starts a timer with a timer duration of T1.

In step h1, in response to that the timer expires, the terminal immediately measures the neighbor cells and reselects to the cell with the highest R value, i.e., the cell 3, by sorting the R values in the R rule.

Example 2, refer to FIG. 11 again.

The terminal is moving at a speed of h km/h relative to the ground, and the signals of cell 1, cell 2 and cell 3 of the moving satellite in the NTN network cover the terminal in turn. Example 2 discloses a cell reselection method including the following steps.

In step a2, the terminal receives auxiliary information from the cell 2 via an RRC message.

The auxiliary information does not include a service reference time T, and the auxiliary information includes coverage information (e.g., diameter L) of the NTN service cell, and a movement speed q (km/s) of the satellite.

In step b2, the service reference time T is determined according to the coverage information of the NTN service cell, an orbital altitude of the satellite and the movement speed of the satellite:

$$T = \frac{L \text{ (km)}}{h \cdot \left(\frac{1 \text{ hr}}{3600 \text{ s}}\right) + q\left(\frac{\text{km}}{\text{s}}\right)}$$

Here, L is the diameter of the NTN cell, h is the speed of the terminal relative to the ground, and q is the movement speed of the satellite.

In step c2, when the terminal is located at position B in the cell 2, the terminal switches from an RRC connected state to an RRC unconnected state, at which time the UE calculates the service time length T1 in which the NTN service cell can provide service to the terminal.

In step d2, the terminal obtains a time threshold K configured by the network from an RRC release message during the switching from the RRC connected state to the RRC unconnected state.

In step e2, the terminal also obtains, from the network, location information of a reference point, i.e., the location information of point A in FIG. 11.

In step f2, the terminal obtains location information of the terminal, i.e., the location information of point B in FIG. 11.

In step g2, the terminal determines, according to the above information, the movement (relative movement) distance of the terminal to point D (cell edge) as x2.

In step h2, the terminal determines, according to the above information, the service time in which the service cell can provide the service to the terminal as T1=x2/L*T.

In step i2, in response to that the service time T1 in which the service cell can provide service is less than or equal to the time threshold K, the terminal immediately measures the neighbor cells and reselects to the cell with the highest R value, i.e., the cell 3, by sorting the R values.

Figure 22:
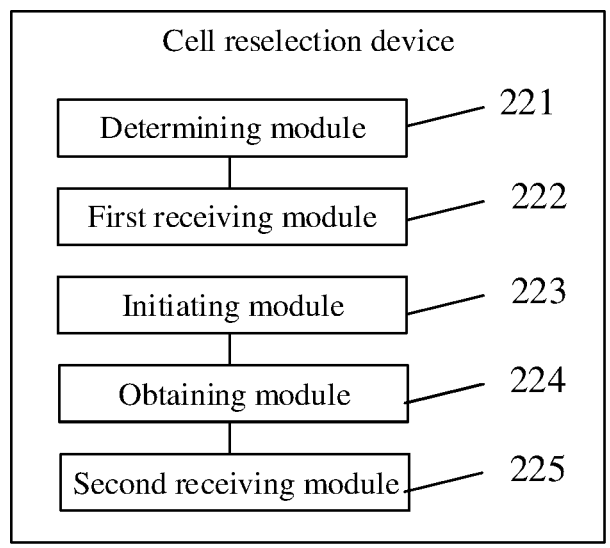
FIG. 22 is a schematic diagram of a cell reselection device according to an embodiment.

As shown in FIG. 22, a cell reselection device is provided in an embodiment of the present disclosure. The device is applied to a terminal, and includes:
 a determining module 221, configured to determine, according to service time determined based on auxiliary information, an operation of performing cell reselection,
 wherein the service time is time in which a non-terrestrial network (NTN) service cell can provide service to the terminal, and the auxiliary information includes coverage information of the NTN service cell, ephemeris information of the NTN service cell, and/or information of reference service time in which the NTN service cell can provide service.

In an embodiment, the determining module 221 is further configured to:
 determine, in response to that the service time is less than or equal to a time threshold, to perform the cell reselection; or
 determine, in response to that the service time is greater than the time threshold, not to perform the cell reselection.

In an embodiment, the device further includes:
 a first receiving module 222, configured to receive a message carrying the time threshold sent from a base station.

In an embodiment, the device further includes:
 an initiating module 223, configured to initiate, in response to that a trigger condition is met, timing of a timer for triggering the cell reselection, wherein a timing length of the timer is determined according to the service time determined when the trigger condition is met,
 the determining module 221 is further configured to:
 determine, in response to that the timer expires, to perform the cell reselection; or
 determine, in response to that the timer does not expire, not to perform the cell reselection.

In an embodiment, the initiating module 223 is further configured to:
 initiate the timing of the timer in response to that the terminal accesses the NTN service cell via the cell reselection; or
 initiate the timing of the timer in response to that the terminal switches from a connected state to a non-connected state in the NTN service cell, wherein the timing length of the timer is less than or equal to the service time.

In an embodiment, the determining module 221 is further configured to:
 determine the service time according to the coverage information of the NTN service cell, information of current location of the terminal, the ephemeris information of the NTN service cell and/or the information of the reference service time in which the NTN service cell can provide the service.

In an embodiment, the determining module 221 is further configured to, in response to that the auxiliary information does not include the information of the reference time in which the NTN service cell can provide the service:
 determine, according to the coverage information of the NTN service cell and the ephemeris information of the NTN service cell, the information of the reference service time in which the NTN service cell can provide the service.

In an embodiment, the determining module 221 is further configured to:
 determine, according to a cell size of the NTN service cell, a movement speed of a satellite and/or an orbital altitude of the satellite, the information of the reference service time in which the NTN service cell can provide the service, wherein the cell size is a radius or a diameter.

In an embodiment, the device further includes an obtaining module 224, configured to obtain the current location of the terminal and a location of a reference point.

The determining module 221 is further configured to:
 determine, according to the current location of the terminal and the location of the reference point, a relative distance between the current location of the terminal and an edge of the NTN service cell, wherein the service time is determined by the terminal according to the relative distance, the cell size of the NTN service cell and the information of the reference service time in which the NTN service cell can provide the service.

In an embodiment, the determining module 221 is further configured to:
 determine the location of the reference point according to the ephemeris information; or
 determine the location of the reference point according to location information of the reference point sent by a base station.

In an embodiment, the device further includes a second receiving module 225,
 the second receiving module 225 is configured to receive the auxiliary information sent by a base station; or
 the determining module is further configured to determine the auxiliary information according to a predetermined configuration in the terminal.

In an embodiment, the second receiving module 225 is further configured to:
 receive a system message carrying the auxiliary information sent by the base station; or
 receive a radio resource control (RRC) message carrying the auxiliary information sent by the base station.

Figure 23:
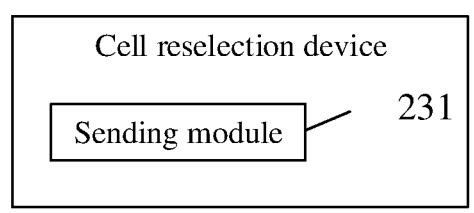
FIG. 23 is a schematic diagram of a cell reselection device according to an embodiment.

As shown in FIG. 23, a cell reselection device is provided in an embodiment of the present disclosure. The device is applied to a base station, and includes:
 a sending module 231, configured to send auxiliary information to a terminal,
 wherein the auxiliary information is configured for the terminal to determine service time in which a non-terrestrial network (NTN) service cell can provide service to the terminal, and the auxiliary information includes coverage information of the NTN service cell, ephemeris information of the NTN service cell, and/or information of reference time in which the NTN service cell can provide service.

In an embodiment, the sending module 231 is further configured to:
 send a system message carrying the auxiliary information to the terminal; or send a radio resource control (RRC) message carrying the auxiliary information to the terminal.

In an embodiment, the sending module 231 is further configured to:

send location information of a reference point to the terminal, wherein the location information of the reference point indicates a location of the reference point for determining the service time.

In an embodiment, the sending module 231 is further configured to:

send a message carrying a time threshold to the terminal, wherein the time threshold is configured for the terminal to perform an operation for the cell reselection.

It is to be noted that a person skilled in the art may understand that the method provided by the embodiment of the present disclosure may be performed alone or together with some of the methods in the embodiments of the present disclosure or some of the methods in the related art.

With regard to the device in the above-mentioned embodiment, the specific manner in which the individual modules perform their operations has been described in detail in the embodiment concerning the method and will not be described in detail here.

An embodiment of the present disclosure provides a communication device, including:

a processor; and a memory for storing executable instructions of the processor, wherein the processor is configured to implement a method applied to any embodiment of the present disclosure when running the executable instructions.

The processor may include various types of storage media that are non-transitory computer storage media that can continue to store information thereon in memory after the communication device is powered down.

The processor may be connected to the memory via a bus or the like for reading an executable program stored on the memory.

An embodiment of the present disclosure also provides a computer storage medium, wherein the computer storage medium stores a computer executable program, and the executable program implements the method according to any embodiment of the present disclosure when being executed by a processor.

With regard to the device in the above-mentioned embodiment, the specific manner in which the individual modules perform their operations has been described in detail in the embodiment concerning the method and will not be described in detail here.

Figure 24:
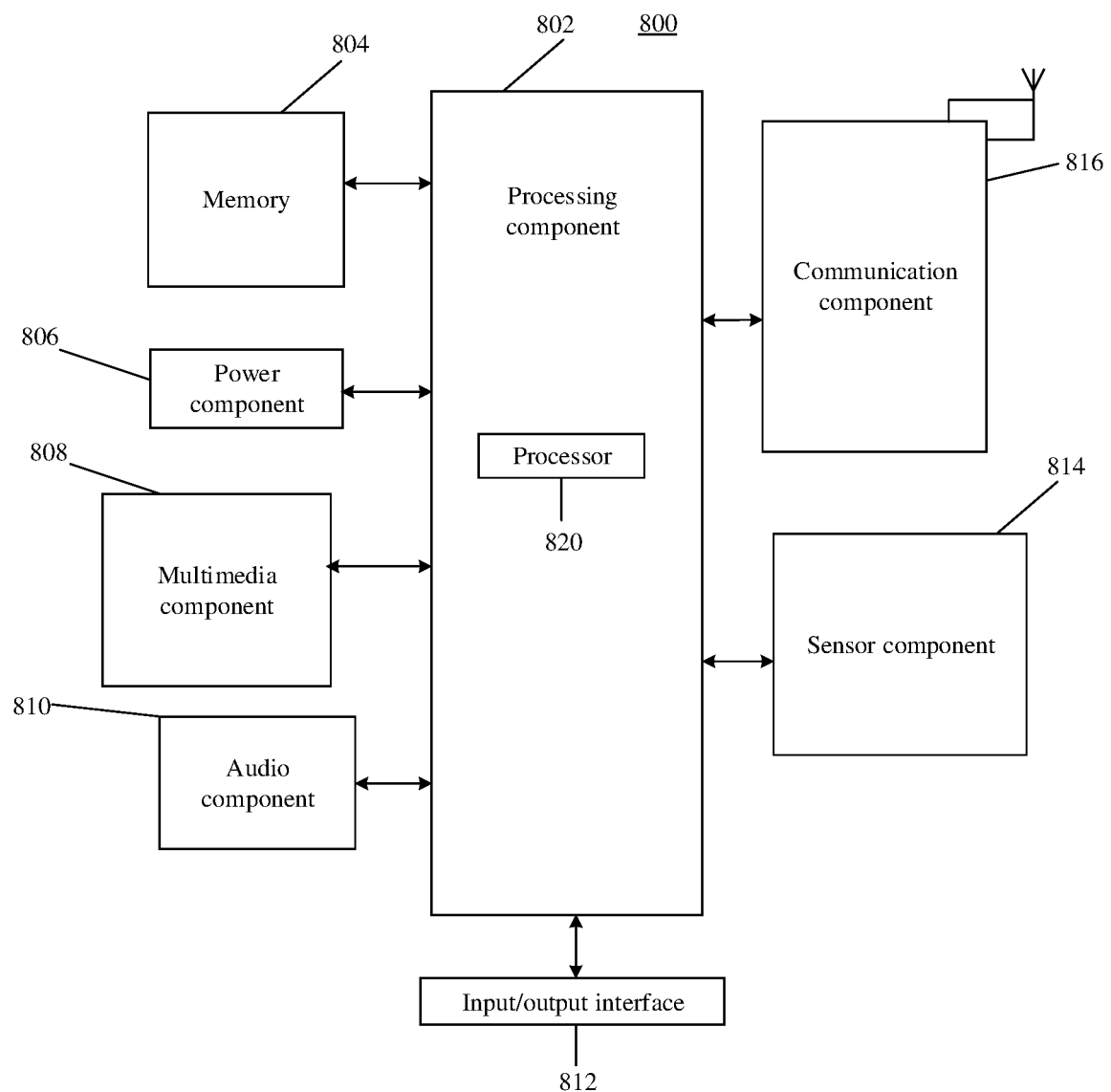
FIG. 24 is a schematic structure diagram of a terminal according to an embodiment.

As shown in FIG. 24, an embodiment of the present disclosure provides a structure of a terminal.

Referring to FIG. 24, an embodiment provides a terminal 800, and the terminal may specifically be a mobile phone, a computer, a digital broadcasting terminal, a messaging device, a game console, a tablet device, a medical device, a fitness device, a personal digital assistant, or the like.

Referring to FIG. 24, the terminal 800 may include one or more of a processing component 802, a memory 804, a power component 806, a multimedia component 808, an audio component 810, an input/output (I/O) interface 812, a sensor component 814, and a communication component 816.

The processing component 802 generally controls the overall operations of the terminal 800, such as operations associated with display, telephone calls, data communications, camera operations, and recording operations. The processing component 802 may include one or more processors 820 to execute instructions to complete all or part of the steps of the foregoing method. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support the operation at the terminal 800. Examples of these data include instructions for any application or method operating on the terminal 800, contact data, phone book data, messages, pictures, videos and the like. The memory 804 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 806 provides power to various components of the terminal 800. The power component 806 may include a power management system, one or more power supplies, and other components associated with generating, managing, and distributing power for the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 808 includes a front camera and/or a rear camera. When the terminal 800 is in an operation mode, such as a shooting mode or a video mode, the front camera and/or the rear camera can receive external multimedia data. Each front camera and rear camera may be a fixed optical lens system or have focal length and optical zoom capabilities.

The audio component 810 is configured to output and/or input audio signals. For example, the audio component 810 includes a microphone (MIC), and when the terminal 800 is in an operation mode, such as a call mode, a recording mode, and a voice recognition mode, the microphone is configured to receive an external audio signal. The received audio signal can be further stored in the memory 804 or sent via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include but are not limited to home button, volume button, start button, and lock button.

The sensor component 814 includes one or more sensors for providing the terminal 800 with various aspects of state evaluation. For example, the sensor component 814 can detect the on/off status of the terminal 800 and the relative positioning of components. For example, the component is a display and keypad of the terminal 800. The sensor component 814 can also detect the position change of the terminal 800 or a component of the terminal 800, the presence or absence of contact between the user and the terminal 800, the orientation or acceleration/deceleration of the terminal 800, and the temperature change of the terminal 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 can access a wireless network based on a communication standard, such as WiFi, 2G, 3G, 4G, 5G or a combination thereof. In an embodiment, the communication component 816 receives a broadcast signal or broadcast related information from an external broadcast management system via a broadcast channel. In an embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the terminal 800 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 804 including instructions, and the instructions may be executed by the processor 820 of the terminal 800 to complete the foregoing method. For example, the non-transitory computer-readable storage medium may be ROM, random access memory (RAM), CD-ROM, magnetic tape, floppy disk, optical data storage device and the like.

Figure 25:
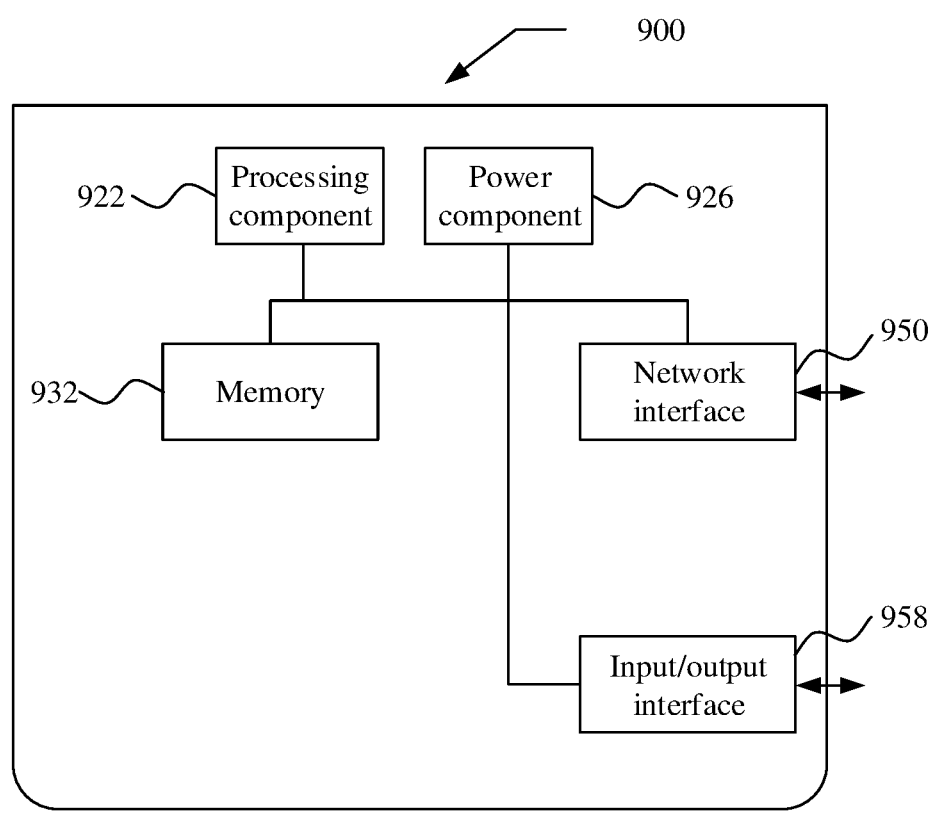
FIG. 25 is a block diagram of a base station according to an embodiment.

As shown in FIG. 25, an embodiment of the present disclosure provides a structure of a base station. For example, the base station 900 may be provided as a network-side device. Referring to FIG. 25, the base station 900 includes a processing component 922 which further includes one or more processors, and a memory resource which is represented by a memory 932 and is configured for storing instructions such as application programs executable by the processing component 922. The application program stored in the memory 932 may include one or more modules each corresponding to a set of instructions. Furthermore, the processing component 922 is configured to execute instructions to perform any of the above methods that are performed at the base station side.

The base station 900 may also include a power component 926 configured to perform power management of the base station 1900, a wired or wireless network interface 950 configured to connect the base station 900 to a network, and an input/output (I/O) interface 958. The base station 900 may operate based on an operating system stored in memory 932, such as Windows Server™, Mac OS X™, Unix™, Linux™, Free BSD™ or the like.

A person skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A cell reselection method, comprising:
    initiating, in response to that a trigger condition is met, timing of a timer for triggering cell reselection; and
    determining, according to service time determined based on auxiliary information, an operation of performing the cell reselection,
    wherein the service time is time in which a non-terrestrial network (NTN) service cell can provide service to a terminal, and the auxiliary information comprises at least one of coverage information of the NTN service cell, ephemeris information of the NTN service cell, or information of reference service time in which the NTN service cell can provide service,
    wherein a timing length of the timer is determined according to the service time determined in response to determining that the trigger condition is met, and
    wherein determining, according to the service time determined based on the auxiliary information, the operation of performing the cell reselection comprises:
        determining, in response to that the timer expires, to perform the cell reselection; or
        determining, in response to that the timer does not expire, not to perform the cell reselection.

2. The method according to claim 1, wherein determining, according to the service time determined based on the auxiliary information, the operation of performing the cell reselection comprises:
    determining, in response to that the service time is less than or equal to a time threshold, to perform the cell reselection; or
    determining, in response to that the service time is greater than the time threshold, not to perform the cell reselection.

3. The method according to claim 2, further comprising:
    receiving a message carrying the time threshold sent from a base station.

4. The method according to claim 1, wherein initiating, in response to that the trigger condition is met, the timing of the timer for triggering the cell reselection comprises:
    initiating the timing of the timer in response to that the terminal accesses the NTN service cell via the cell reselection, or that the terminal switches from a connected state to a non-connected state in the NTN service cell, wherein the timing length of the timer is less than or equal to the service time.

5. The method according to claim 1, further comprising:
    determining the service time according to at least one of the coverage information of the NTN service cell, information of current location of the terminal, the ephemeris information of the NTN service cell, or the information of the reference service time in which the NTN service cell can provide the service.

6. The method according to claim 5, further comprising, in response to that the auxiliary information does not comprise the information of the reference service time in which the NTN service cell can provide the service:
determining, according to the coverage information of the NTN service cell and the ephemeris information of the NTN service cell, the information of the reference service time in which the NTN service cell can provide the service.

7. The method according to claim 6, wherein determining, according to the coverage information of the NTN service cell and the ephemeris information of the NTN service cell, the information of the reference service time in which the NTN service cell can provide the service comprises:
determining, according to at least one of a cell size of the NTN service cell, a movement speed of a satellite, or an orbital altitude of the satellite, the information of the reference service time in which the NTN service cell can provide the service, wherein the cell size is a radius or a diameter.

8. The method according to claim 7, further comprising:
determining, according to the current location of the terminal and a location of a reference point, a relative distance between the current location of the terminal and an edge of the NTN service cell, wherein the service time is determined by the terminal according to the relative distance, the cell size of the NTN service cell and the information of the reference service time in which the NTN service cell can provide the service.

9. The method according to claim 8, further comprising:
determining the location of the reference point according to at least one of the ephemeris information or location information of the reference point sent by a base station.

10. The method according to claim 1, further comprising at least one of:
receiving the auxiliary information sent by a base station; or determining the auxiliary information according to a predetermined configuration in the terminal.

11. The method according to claim 10, wherein receiving the auxiliary information sent by the base station comprises at least one of:
receiving a system message carrying the auxiliary information sent by the base station; or
receiving a radio resource control (RRC) message carrying the auxiliary information sent by the base station.

12. A cell reselection device, comprising:
a processor; and
a memory storing instructions executable by the processor,
wherein the processor is configured to:
initiate, in response to that a trigger condition is met, timing of a timer for triggering cell reselection; and
determine, according to service time determined based on auxiliary information, an operation of performing the cell reselection,
wherein the service time is time in which a non-terrestrial network (NTN) service cell can provide service to the terminal, and the auxiliary information comprises at least one of coverage information of the NTN service cell, ephemeris information of the NTN service cell, or information of reference service time in which the NTN service cell can provide service,
wherein a timing length of the timer is determined according to the service time determined in response to determining that the trigger condition is met,
wherein determining, according to the service time determined based on the auxiliary information, the operation of performing the cell reselection comprises:
determining, in response to that the timer expires, to perform the cell reselection; or
determining, in response to that the timer does not expire, not to perform the cell reselection.

13. The device according to claim 12, wherein the processor is further configured to:
determine, in response to that the service time is less than or equal to a time threshold, to perform the cell reselection; or
determine, in response to that the service time is greater than the time threshold, not to perform the cell reselection.

14. The device according to claim 13, wherein the processor is further configured to:
receive a message carrying the time threshold sent from a base station.

15. The device according to claim 12, wherein initiating, in response to that the trigger condition is met, the timing of the timer for triggering the cell reselection comprises:
initiating the timing of the timer in response to that the terminal accesses the NTN service cell via the cell reselection, or that the terminal switches from a connected state to a non-connected state in the NTN service cell, wherein the timing length of the timer is less than or equal to the service time.

16. The device according to claim 12, wherein the processor is further configured to:
determine the service time according to at least one of the coverage information of the NTN service cell, information of current location of the terminal, the ephemeris information of the NTN service cell, or the information of the reference service time in which the NTN service cell can provide the service.

17. The device according to claim 16, wherein the processor is further configured to: in response to that the auxiliary information does not comprise the information of the reference service time in which the NTN service cell can provide the service, determine, according to the coverage information of the NTN service cell and the ephemeris information of the NTN service cell, the information of the reference service time in which the NTN service cell can provide the service.

18. The device according to claim 17, wherein determining, according to the coverage information of the NTN service cell and the ephemeris information of the NTN service cell, the information of the reference service time in which the NTN service cell can provide the service comprises:
determining, according to at least one of a cell size of the NTN service cell, a movement speed of a satellite, or an orbital altitude of the satellite, the information of the reference service time in which the NTN service cell can provide the service, wherein the cell size is a radius or a diameter.

19. The device according to claim 18, wherein the processor is further configured to:
determine, according to the current location of the terminal and a location of a reference point, a relative distance between the current location of the terminal and an edge of the NTN service cell, wherein the service time is determined by the terminal according to the relative distance, the cell size of the NTN service cell and the information of the reference service time in which the NTN service cell can provide the service.

20. The device according to claim 19, wherein the processor is further configured to:
   determine the location of the reference point according to at least one of the ephemeris information or location information of the reference point sent by a base station.

\* \* \* \* \*